(12) United States Patent
Nishida et al.

(10) Patent No.: US 7,974,028 B2
(45) Date of Patent: Jul. 5, 2011

(54) MAGNETIC TRANSFER MASTER CARRIER AND MAGNETIC TRANSFER METHOD

(75) Inventors: Yoichi Nishida, Odawara (JP); Hideyuki Kubota, Odawara (JP); Makoto Nagao, Odawara (JP); Ryuji Sugita, Hitachi (JP); Takashi Komine, Hitachi (JP)

(73) Assignee: Fujifilm Corporation, Tokyo (JP)

( * ) Notice: Subject to any disclaimer, the term of this patent is extended or adjusted under 35 U.S.C. 154(b) by 240 days.

(21) Appl. No.: 12/411,751

(22) Filed: Mar. 26, 2009

(65) Prior Publication Data
US 2009/0244748 A1 Oct. 1, 2009

(30) Foreign Application Priority Data

Mar. 28, 2008 (JP) ................. 2008-088759
Sep. 30, 2008 (JP) ................. 2008-255075

(51) Int. Cl.
*G11B 5/86* (2006.01)
(52) U.S. Cl. ........................................ 360/17
(58) Field of Classification Search ................. None
See application file for complete search history.

(56) References Cited

U.S. PATENT DOCUMENTS

| 6,865,039 B2 * | 3/2005 | Hamaguchi et al. ............ 360/17 |
| 7,054,082 B2 * | 5/2006 | Nishikawa et al. ............ 360/17 |
| 7,218,465 B1 | 5/2007 | Deeman et al. |
| 2006/0158763 A1 * | 7/2006 | Nagao et al. .................... 360/17 |
| 2008/0131733 A1 * | 6/2008 | Maeda ........................ 428/828.1 |
| 2009/0073593 A1 * | 3/2009 | Fujiwara et al. ............... 360/17 |

FOREIGN PATENT DOCUMENTS

| JP | 2000-195048 | 7/2000 |
| JP | 2003-2003325 | 7/2003 |

* cited by examiner

*Primary Examiner* — Daniell L Negrón
*Assistant Examiner* — Regina N Holder
(74) *Attorney, Agent, or Firm* — Young & Thompson

(57) ABSTRACT

A magnetic transfer master carrier of the present invention includes a base material having convex portions on its surface, the convex portions being provided corresponding to a pattern of information to be recorded on a perpendicular magnetic recording medium, and a magnetic layer deposited at least on top surfaces of the convex portions, wherein when a magnetic field is applied to the magnetic transfer master carrier, the magnetic layer absorbs a magnetic flux so as to form a pattern of the magnetic field, wherein the magnetic layer includes at least two perpendicular magnetic anisotropic layers, and an antiferromagnetic coupling induction layer which is provided so as to be sandwiched in between two neighboring layers of all the perpendicular magnetic anisotropic layers, and to induce antiferromagnetic coupling therebetween.

7 Claims, 10 Drawing Sheets

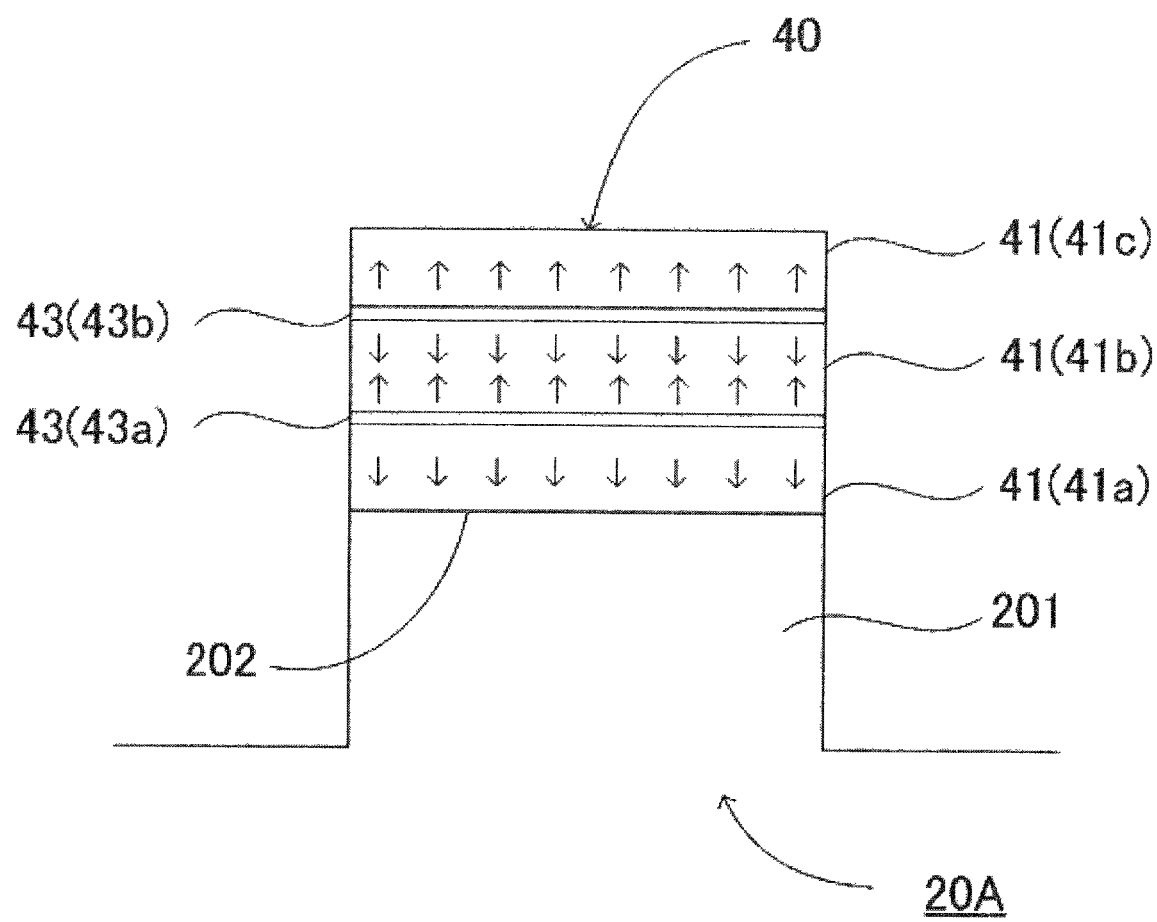

MAGNETIC TRANSFER MASTER CARRIER AND MAGNETIC TRANSFER METHOD

BACKGROUND OF THE INVENTION

1. Field of the Invention

The present invention relates to a magnetic transfer master carrier for magnetically transferring information to a magnetic recording medium, a magnetic transfer method using the magnetic transfer master carrier, and a magnetic recording medium in which information is magnetically transferred using the magnetic transfer master carrier.

2. Description of the Related Art

As magnetic recording media capable of recording information in a highly dense manner, magnetic recording media for perpendicular magnetic recording system (hereinafter referred to as perpendicular magnetic recording medium) are known. An information recording area of a perpendicular magnetic recording medium is composed of narrow tracks. Thus, a tracking servo technology for accurate scanning with a magnetic head within a narrow track width and for recording and reproducing a signal at a high S/N ratio is important to the perpendicular magnetic recording medium. To perform this tracking servo, it is necessary to record servo information, for example a servo signal for tracking, an address information signal, a reproduction clock signal, etc. as a so-called preformat, at predetermined intervals on the perpendicular magnetic recording medium.

As a method for preformatting servo information on a perpendicular magnetic recording medium, there is, for example, a method wherein a master carrier having a pattern consisting of a plurality of convex portions having a magnetic layer on their surfaces, which corresponds to servo information, is closely attached to the perpendicular magnetic recording medium, and then a recording magnetic field is applied thereto so as to magnetically transfer the servo information corresponding to the pattern of the master carrier to the perpendicular magnetic recording medium (see, Japanese Patent Application Laid-Open (JP-A) Nos. 2003-203325 and 2000-195048 and U.S. Pat. No. 7,218,465, for example).

In this method, when the recording magnetic field has been applied to the master carrier closely attached to the perpendicular magnetic recording medium, a magnetic flux is absorbed into the patterned magnetic layer based upon the magnetized state of the master carrier. As a result, the recording magnetic field is increased in strength according to the pattern of the master carrier. The magnetic field increased in strength in the form of the pattern enables to magnetize only predetermined regions of the perpendicular magnetic recording medium. Thus, the servo information corresponding to the pattern of the master carrier is magnetically transferred to the perpendicular magnetic recording medium.

After the magnetic transfer, the recording magnetic field is cancelled, and the master carrier which has been closely attached to the perpendicular magnetic recording medium is separated therefrom.

Conventionally, magnetic materials with high saturation magnetization have been used as materials for magnetic layers of master carriers of this type. This is because when a recording magnetic field is applied, the magnetization of the magnetic layer of the master carrier is increased so as to easily absorb a magnetic flux in the magnetic layer.

However, the magnetic layer of the master carrier is very thin, specifically, roughly several tens of nanometers in thickness, thereby strongly influenced by a demagnetizing field. Therefore, even if a magnetic material with high saturation magnetization is used as the material of the magnetic layer, the strength of an effective magnetic field (recording magnetic field) applied to the magnetic layer decreases due to the demagnetizing field, and the magnetization of the magnetic layer becomes unsaturated. As a result, the magnetization of the magnetic layer cannot be increased as much as desired, causing a problem.

Moreover, it may be considered that the magnetic field to be applied is increased so as to achieve a suitable magnetization of the magnetic layer. However, when the magnetic filed to be applied is increased, a magnetic field present in regions other than the patterned magnetic layer of the master carrier may magnetize the perpendicular magnetic recording medium. This is also problematic.

Moreover, conventionally, a magnetic layer of such master carrier has high residual magnetization, and caused problems. As described above, even though the recording magnetic field is cancelled after the magnetic transfer, the residual magnetization is still present in the magnetic layer of the master carrier. In the case where the residual magnetization remains high, when the master carrier is separated from the perpendicular magnetic recording medium as described above, the position of the master carrier may be slightly shifted in a direction along the surface of the perpendicular magnetic recording medium. As a result, the residual magnetization in the magnetic layer of the master carrier may unnecessarily magnetize the perpendicular magnetic recording medium.

BRIEF SUMMARY OF THE INVENTION

The present invention is aimed to solve the above conventional problems, and to achieve the following object. That is, an object of the present invention is to provide a magnetic transfer master carrier having a magnetic layer in which magnetization occurs in a direction of applied magnetic field upon application of the magnetic field and the residual magnetization is suppressed upon cancellation of the magnetic field, and a magnetic transfer method using the magnetic transfer master carrier.

Means for solving the problems are as follows.

<1> A magnetic transfer master carrier including a base material having convex portions on its surface, the convex portions being provided corresponding to a pattern of information to be recorded on a perpendicular magnetic recording medium, and a magnetic layer deposited at least on top surfaces of the convex portions, wherein when a magnetic field is applied to the magnetic transfer master carrier, the magnetic layer absorbs a magnetic flux so as to form a pattern of the magnetic field, wherein the magnetic layer includes at least two perpendicular magnetic anisotropic layers, and an antiferromagnetic coupling induction layer which is provided so as to be sandwiched in between two neighboring layers of all the perpendicular magnetic anisotropic layers and to induce antiferromagnetic coupling therebetween.

The magnetic transfer master carrier according to <1> includes the magnetic is layer having at least two perpendicular magnetic anisotropic layers, and the antiferromagnetic coupling induction layer which is provided so as to be sandwiched in between two neighboring layers of the perpendicular magnetic anisotropic layers and to induce antiferromagnetic coupling therebetween. Therefore, the antiferromagnetic coupling exits between the adjacent two perpendicular magnetic anisotropic layers so as to suppress residual magnetization. Moreover, the antiferromagnetic coupling is canceled by applying a magnetic field more than or equal to a certain value, and then a magnetic field is generated in a direction of applied magnetic field.

<2> The magnetic transfer master carrier according to <1>, wherein when in the two perpendicular magnetic anisotropic layers sandwiching the antiferromagnetic coupling induction layer, a residual magnetization $Mr_u$ of one of the perpendicular magnetic anisotropic layers deposited close to each convex portion is multiplied by a thickness $t_u$ thereof to give $Mr_u t_u$, and a residual magnetization $Mr_l$ of the other perpendicular magnetic anisotropic layer is multiplied by a thikness $t_l$ thereof to give $Mr_l t_l$, a ratio of $Mr_u t_u$ to $Mr_l t_l$, $Mr_u t_u/Mr_l t_l$, is 0.5 to 2.

<3> The magnetic transfer master carrier according to any one of <1> to <2>, wherein when the two perpendicular magnetic anisotropic layers sandwiching the antiferromagnetic coupling induction layer have the same residual magnetization, one of the perpendicular magnetic anisotropic layers deposited close to each convex portion has a thickness "wa" and the other perpendicular magnetic anisotropic layer has a thickness "wb", a ratio of "wb" to "wa", "wb/wa" is 2 to 0.2.

<4> The magnetic transfer master carrier according to <3>, wherein the ratio of "wb" to "wa", "wb/wa" is 2 to 0.5.

<5> The magnetic transfer master carrier according to any one of <3> to <4>, wherein the ratio of "wb" to "wa", "wb/wa" is 1.5 to 0.5.

<6> The magnetic transfer master carrier according to any one of <1> to <5>, wherein the perpendicular magnetic anisotropic layer has a thickness of 2 nm to 60 nm.

<7> The magnetic transfer master carrier according to any one of <1> to <6>, wherein the perpendicular magnetic anisotropic layer of the magnetic layer is deposited by sputtering under the following condition 1 and the antiferromagnetic coupling induction layer of the magnetic layer is deposited by sputtering under the following condition 2:

<Condition 1>
Target material: CoPt
Pressure: 0.3 Pa
Distance between a base material and a target: 200 mm
DC power: 1,000 W <Condition 2>
Target material: Ru
Pressure: 0.3 Pa
Distance between a base material and a target: 200 mm
DC power: 100 W <8> A magnetic transfer method including initially magnetizing a perpendicular magnetic recording medium by applying a magnetic field thereto, closely attaching a magnetic transfer master carrier according to any one of <1> to <7> to the perpendicular magnetic recording medium which has been initially magnetized, and magnetically transferring information to the perpendicular magnetic recording medium by applying a magnetic field which acts in the opposite direction to the initial magnetization, with the perpendicular magnetic recording medium and the magnetic transfer master carrier closely attached to each other, to thereby record the information on the perpendicular magnetic recording medium.

According to the present invention, the conventional problems can be solved, and a magnetic transfer master carrier and a magnetic transfer method using the magnetic transfer master carrier can be provided, wherein the magnetic transfer master carrier has a magnetic layer in which magnetization occurs in a direction of applied magnetic field upon application of a magnetic field, and a residual magnetization is suppressed upon cancellation of the magnetic field.

BRIEF DESCRIPTION OF THE DRAWINGS

FIG. 13 is an explanatory diagram schematically showing an example of a magnetic layer of a magnetic transfer master carrier according to another embodiment of the present invention.

DETAILED DESCRIPTION OF THE INVENTION

Hereinafter, a magnetic transfer master carrier, a magnetic transfer method and a magnetic recording medium according to one embodiment of the present invention will be explained with reference to the drawings.

Figure 1A:
FIG. 1A is an explanatory diagram schematically showing an example of an initially magnetizing step in a magnetic transfer method.
Figure 1A:
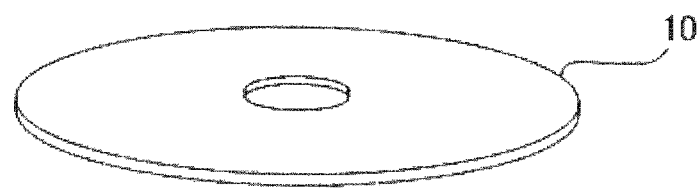
Figure 1B:
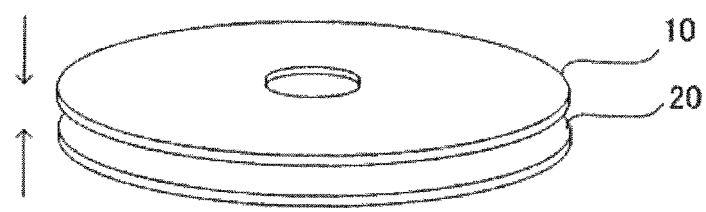
FIG. 1B is an explanatory diagram schematically showing an example of a closely attaching step in a magnetic transfer method.
Figure 1C:
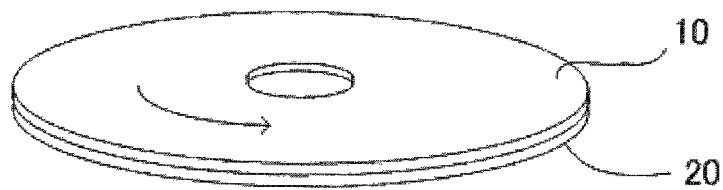
FIG. 1C is an explanatory diagram schematically showing an example of a magnetic transfer step in a magnetic transfer method.
Figure 1C:
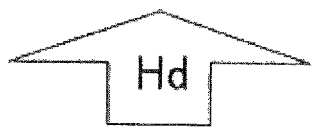

FIGS. 1A to 1C are explanatory diagrams schematically showing a magnetic transfer method, wherein information is magnetically transferred to a perpendicular magnetic recording medium using the magnetic transfer master carrier. The magnetic transfer method includes an initially magnetizing step, a closely attaching step and a magnetic transfer step. First of all, an outline of a magnetic transfer technique using the magnetic transfer master carrier will be explained with reference to FIGS. 1A to 1C.

[Outline of Magnetic Transfer Technique]

In FIGS. 1A to 1C, 10 denotes a slave disk that is a perpendicular magnetic recording medium, and 20 denotes a master disk serving as a magnetic transfer master carrier.

FIG. 1A is an explanatory diagram schematically showing an example of the initially magnetizing step. As shown in FIG. 1A, a DC magnetic field (Hi) is applied to the slave disk 10, so as to initially magnetize the slave disk 10 in the initially magnetizing step. The DC magnetic field (Hi) is perpendicularly applied to a flat surface of the slave disk 10.

FIG. 1B is an explanatory diagram schematically showing an example of the closely attaching step. As shown in FIG. 1B, the master disk 20 is closely attached to the slave disk 10, which has been initially magnetized, in the closely attaching step.

FIG. 1C is an explanatory diagram schematically showing an example of the magnetic transfer step. As shown in FIG. 1C, a magnetic field (Hd) (recording magnetic field) which acts in the opposite direction to the direction of the magnetic field (Hi) is applied to the slave disk 10 and the master disk 20 which have been closely attached to each other, so as to record (magnetically transfer) information based on the master disk 20 in the slave disk 10 in the magnetic transfer step.

Next, the magnetic transfer master carrier, magnetic transfer method and magnetic recording medium will be explained in detail with reference to the drawings.

[Magnetic Transfer Master Carrier]

Figure 2:
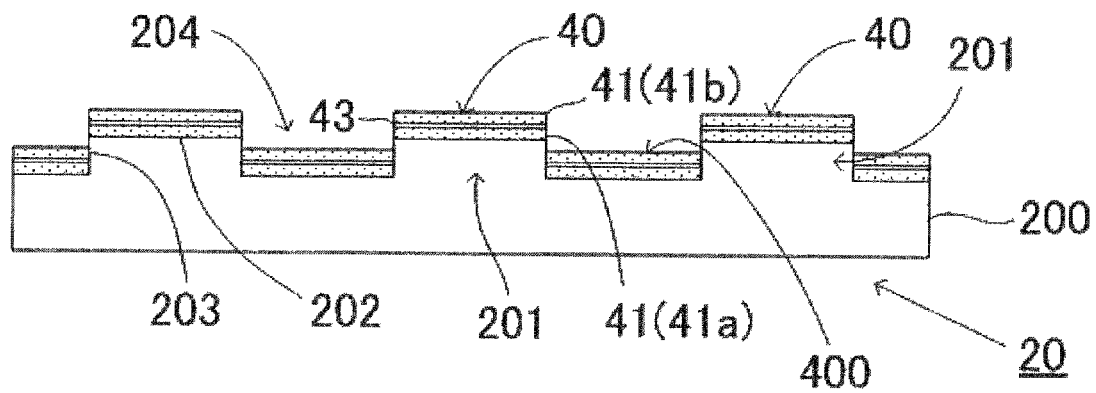
FIG. 2 is an explanatory diagram schematically showing an example of a cross-sectional view of a magnetic transfer master carrier.

FIG. 2 is an explanatory diagram schematically showing an example of a cross-sectional view of a magnetic transfer master carrier (master disk) 20. The magnetic transfer master carrier 20 includes a base material 200 and a magnetic layer 40 as shown in FIG. 2.

(Base Material)

The material of the base material 200 is not particularly limited and may be appropriately selected from those known depending on the purpose. Examples thereof include glass, synthetic resins such as polycarbonates, metals such as nickel and aluminum, silicon and carbon.

The shape of the base material 200 is not particularly limited and may be appropriately selected depending on the intended purpose. An example of the magnetic transfer master carrier 20 shown in FIG. 2 is disk-shaped. The base material 200 has a plurality of convex portions 201 on its surface.

The convex portions 201 are provided on the surface of the base material 200 corresponding to a pattern of information to be recorded in the perpendicular magnetic recording medium. Examples of information to be recorded in the perpendicular magnetic recording medium include servo information for tracking servo technique, such as a servo signal and an address information signal. The convex portions 201 form a pattern corresponding to a size of information to be recorded on a surface of the base material 200. The number of convex portions 201 provided on the surface of the base material 200 is not particularly limited and may be appropriately selected depending on the purpose.

Figure 3:
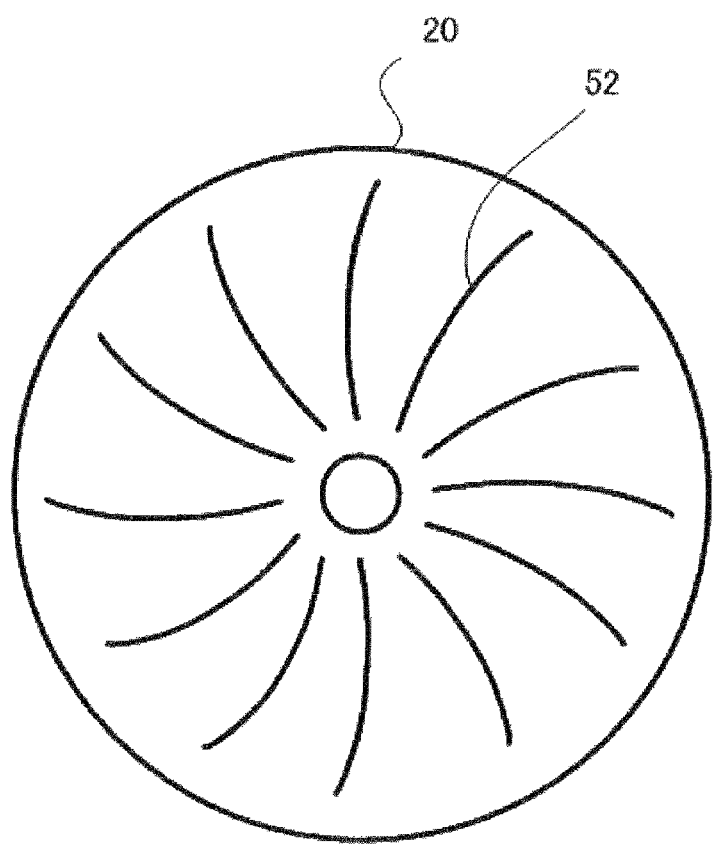
FIG. 3 is an explanatory diagram showing an example of a top surface of a magnetic transfer master carrier.

FIG. 3 is an explanatory diagram schematically showing an example of a top surface of a magnetic transfer master carrier (master disk) 20. As shown in FIG. 3, on the surface (top surface) of the magnetic transfer master carrier 20, patterns (servo pattern 52) consisting of convex portions provided corresponding to the pattern of the servo information are formed radially.

The surface of each of the convex portions 201 consists of a top surface 202 and side surfaces 203 as shown in FIG. 2. In the present embodiment, the top surface 202 is a flat surface The shape of the top surface 202 is not particularly limited and may be appropriately selected depending on the purpose. In the present embodiment, the top surface 202 is a quadrangle (square). A concave portion 204 is formed between the convex portions 201.

(Magnetic Layer)

The magnetic layer 40 is formed at least on the top surfaces 202 of the surfaces of the convex portions 201. As shown in FIG. 2, in the present embodiment, the magnetic layer 400 is formed on surfaces of the concave portions 204, in addition to the top surfaces 202 of the convex portions 201, because of easiness of production and the like. Moreover, the magnetic layer 40 may be formed on the side surfaces 203 of the convex portions 201, as necessary.

The magnetic layer 40 includes a perpendicular magnetic anisotropic layer 41 and an antiferromagnetic coupling induction layer 43. The magnetic layer 40 may also include other layers such as an underlying layer, protective layer and the like, as necessary.

<Perpendicular Magnetic Anisotropic Layer>

The magnetic layer 40 includes at least two perpendicular magnetic anisotropic layers 41. According to the embodiment shown in FIG. 2, the magnetic layer 40 of the magnetic transfer master carrier 20 includes two perpendicular magnetic anisotropic layers 41.

Among two perpendicular magnetic anisotropic layers 41, one deposited under the antiferromagnetic coupling induction layer 43 and close to each convex portion is a perpendicular magnetic anisotropic layer 41a, and the other deposited on the antiferromagnetic coupling induction layer 43 is a perpendicular magnetic anisotropic layer 41b.

In another embodiment, the number of the perpendicular magnetic anisotropic layer 41 may be three or four, other than two. The number of the perpendicular magnetic anisotropic layer 41 may be an even number such as two or the like, or an odd number such as three or the like.

A material of the perpendicular magnetic anisotropic layer 41 includes a magnetic material having perpendicular magnetic anisotropy. The magnetic material used for the perpendicular magnetic anisotropic layer 41 includes an alloy and compound composed of at least one ferromagnetic metal selected from the group consisting of Fe, Co and Ni, and at least one nonmagnetic material selected from the group consisting of Cr, Pt, Ru, Pd, Si, Ti, B, Ta and O.

The perpendicular magnetic anisotropic layer 41 has magnetic anisotropy in a direction perpendicular to the in-plane direction of the perpendicular magnetic anisotropic layer 41.

That is, the perpendicular magnetic anisotropic layer 41 has magnetic anisotropy in a lamination direction of the magnetic layer 40.

The thickness "w" of the perpendicular magnetic anisotropic layer 41 is not particularly limited and may be appropriately set depending on the purpose. It is preferably 2 nm to 60 nm, more preferably 10 nm to 40 nm, and still more preferably 15 nm to 25 nm.

When the thickness "w" of the perpendicular magnetic anisotropic layer 41 is less than 2 nm, the uppermost surface of the master carrier may be insufficiently magnetized. When the thickness "w" is more than 60 nm, the effect of antiferromagnetic coupling may be decreased.

The thickness "w" of the perpendicular magnetic anisotropic layer 41 can be measured by an interatomic force microscope, Dimension5000 manufactured by Veeco Instruments Inc.

The thickness of the perpendicular magnetic anisotropic layer 41 is an average value of the thickness (average thickness). The thickness "w" is obtained by averaging the thickness measured at 16 points in total, specifically 4 points at intervals of 90 degrees in each radius of 5 mm, 10 mm, 20 mm and 30 mm.

Particularly, the thickness "w" of two perpendicular magnetic anisotropic layers 41 adjacent to the antiferromagnetic coupling induction layer 43 has the following relation. Here, the relation between the thicknesses of the two perpendicular magnetic anisotropic layers according to the present embodiment will be explained with an example of two perpendicular magnetic anisotropic layers 41a and 41b.

The thickness "wa" of the perpendicular magnetic anisotropic layer 41a is not particularly limited and may be appropriately set depending on the purpose. It is preferably 1 nm to 30 nm, more preferably 5 nm to 20 nm, and still more preferably 7 nm to 13 nm.

When the thickness "wa" of the perpendicular magnetic anisotropic layer 41a is less than 2 nm, the uppermost surface of the master carrier may be insufficiently magnetized. When the thickness "wa" is more than 30 nm, the effect of antiferromagnetic coupling may be decreased.

The thickness "wb" of the perpendicular magnetic anisotropic layer 41b is not particularly limited and may be appropriately set depending on the purpose. It is preferably 2 nm to 60 nm, more preferably 10 nm to 40 nm, and still more preferably 15 nm to 25 nm.

When the thickness "wb" of the perpendicular magnetic anisotropic layer 41b is less than 2 nm, the uppermost surface of the master carrier may be insufficiently magnetized. When the thickness "wb" is more than 60 nm, the effect of antiferromagnetic coupling may be decreased.

A residual magnetization $Mr_u$ of the perpendicular magnetic anisotropic layer 41a is multiplied by a thickness $t_u$ thereof to give $Mr_u t_u$, a residual magnetization $Mr_l$ of the perpendicular magnetic anisotropic layer 41b is multiplied by the thickness $t_l$ thereof to give $Mr_l t_l$, and a ratio of $Mr_u t_u$ to $Mr_l t_l$, $Mr_u t_u / Mr_l t_l$, is preferably 0.5 to 2, and more preferably 0.7 to 1.5. When the ratio $Mr_u t_u / Mr_l t_l$ is 0.8 to 1.3, the suppression of the residual magnetization (residual magnetic flux density) becomes most effective.

When the two perpendicular magnetic anisotropic layers have the same residual magnetization, for example, for the reason that both the perpendicular magnetic anisotropic layer 41a and the perpendicular magnetic anisotropic layer 41b are composed of the same material, a ratio of the thickness "wb" of the perpendicular magnetic anisotropic layer 41b to the thickness "wa" of the perpendicular magnetic anisotropic layer 41a, wb/wa, is preferably 2 to 0.2, more preferably 2 to 0.5, still more preferably 1.5 to 0.5, and particularly preferably 1.3 to 0.8. When the ratio wb/wa is 1.3 to 0.8, the suppression of the residual magnetization (residual magnetic flux density) becomes most effective.

As a method for depositing the perpendicular magnetic anisotropic layer 41, for example, sputtering is used. The perpendicular magnetic anisotropic layer 41 can be deposited by sputtering under the appropriately selected conditions of a film deposition pressure (Pa), a distance between a base material and a target (mm), and a DC power (W).

When the perpendicular magnetic anisotropic layer 41 is composed of CoPt the perpendicular magnetic anisotropy of the perpendicular magnetic anisotropic layer 41 can be controlled by adjusting the film deposition pressure and Pt content (target composition ratio).

The expression "have perpendicular magnetic anisotropy" concerning the perpendicular magnetic anisotropic layers 41 of the magnetic layer 40 is defined as the case where the ratio (Mpe/Min) of the magnetization value (Mpe) of a perpendicular magnetization curve to the magnetization value (Min) of an in-plane magnetization curve, calculated by the following method, is 1 or more in a hysteresis loop, in which demagnetizing field is corrected The method for calculating Min and Mpe is as follows.

The same layer as the magnetic layer 40 of the magnetic transfer master carrier is deposited over a glass substrate having 2.5 inch-thick under the same condition as that at the time of production of the master carrier. The sample formed over the glass substrate is cut into a size of 6 mm×8 mm, then a magnetic field is applied in an in-plane direction and a perpendicular direction to the cut sample, using a vibrating sample magnetometer (VSM-C7, manufactured by TOEI INDUSTRY CO., LTD.), and the magnetization curves of the sample are thus measured.

Based upon the magnetization curves obtained, the magnetization value (Mpe) of the perpendicular magnetization curve and the magnetization value (Min) of the in-plane magnetization curve at a strength of an externally applied magnetic field equal to that of a recording magnetic field are calculated.

<Antiferromagnetic Coupling Induction Layer>

The antiferromagnetic coupling induction layer 43 is surely provided between the perpendicular magnetic anisotropic layers 41. When the perpendicular magnetic anisotropic layers 41 consist of three layers, the magnetic layer 40 includes two antiferromagnetic coupling induction layers 43. When the perpendicular magnetic anisotropic layers 41 consist of six layers, the magnetic layer 40 includes five antiferromagnetic coupling induction layers 43.

The antiferromagnetic coupling induction layer 43 is a layer which serves to induce antiferromagnetic coupling to be generated between the two perpendicular magnetic anisotropic layers.

As the material of the antiferromagnetic coupling induction layer 43, a metal, alloy or laminated body composed of at least one selected from the group consisting of Ru, Ir, Rh, Re and Cr is used.

The thickness "x" of the antiferromagnetic coupling induction layer 43 is not particularly limited and may be appropriately selected depending on the purpose.

It is preferably 0.1 nm to 2 nm, more preferably 0.3 nm to 1.5 nm, and still more preferably 0.5 nm to 1 nm.

When the thickness "x" of the antiferromagnetic coupling induction layer 43 is less than 0.1 nm, a thin film is not uniformly formed, therefore, the perpendicular magnetic anisotropic layer 41a located under the antiferromagnetic coupling induction layer 43 and the perpendicular magnetic anisotropic layer 41b located on the antiferromagnetic coupling induction layer 43 contact in part and may be combined into one. When the thickness "x" of the antiferromagnetic coupling induction layer 43 is more than 2 nm, the antiferromagnetic coupling effect between the perpendicular magnetic anisotropic layer 41a located under the antiferromagnetic coupling induction layer 43 and the perpendicular magnetic anisotropic layer 41b located on the antiferromagnetic coupling induction layer 43 may not be obtained.

The thickness "w" of the antiferromagnetic coupling induction layer 43 can be obtained in such a manner that a section of a cross-section of the antiferromagnetic coupling induction layer 43 is produced, and then the section is measured by a transmission electron microscope (TEM).

The value of thickness of the antiferromagnetic coupling induction layer 43 is an average value of the thickness (average thickness). The thickness is obtained by averaging the thickness measured at 4 points in total, specifically 2 points at intervals of 180 degrees in each radius of 10 mm and 20 mm.

The antiferromagnetic coupling induction layer 43 may be deposited by sputtering, in the same manner as in the film deposition method of the perpendicular magnetic anisotropic layer 41. The antiferromagnetic coupling induction layer 43 may be deposited by sputtering under the appropriately selected conditions of a film deposition pressure (Pa), a distance between a base material, and a target (mm) and a DC power (W).

Here, the function of the magnetic layer 40 in the magnetic transfer master carrier 20 of the present invention will be explained in the case of the magnetic layer 40 consists of the two perpendicular magnetic anisotropic layers 41 (41a, 41b) and one antiferromagnetic coupling induction layer 43 sandwiched therebetween as an example.

Figure 4A:
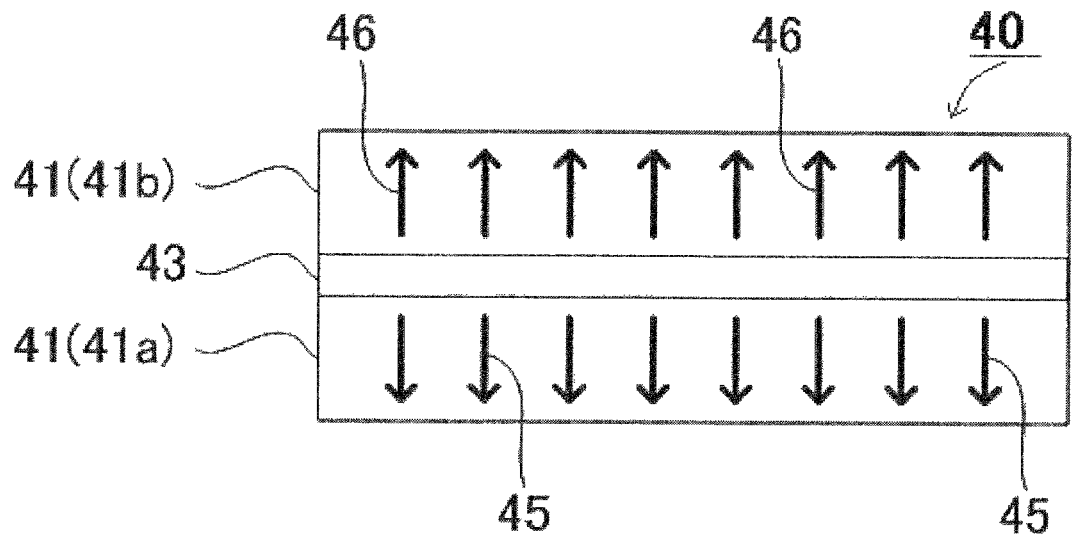
FIG. 4A is an explanatory diagram schematically showing an example of a magnetic layer in which a magnetic field is not applied.

FIG. 4A is an explanatory diagram schematically showing an example of the magnetic layer 40 in which a magnetic field is not externally applied.

In FIG. 4A, an arrow 45 represents a spin in the perpendicular magnetic anisotropic layer 41a and an arrow 46 represents a spin in the perpendicular magnetic anisotropic layer 41b.

As shown in FIG. 4A, in the magnetic layer 40 in which a magnetic field is not externally applied, the spin 45 in the perpendicular magnetic anisotropic layer 41a and the spin 46 in the perpendicular magnetic anisotropic layer 41b tend to form an antiparallel relation.

This is because the antiferromagnetic coupling induction layer 43 has a function of inducing antiferromagnetic coupling between the perpendicular magnetic anisotropic layer 41a and the perpendicular magnetic anisotropic layer 41b.

Both the perpendicular magnetic anisotropic layer 41a and the perpendicular magnetic anisotropic layer 41b have perpendicular magnetic anisotropy. Thus, in the magnetic layer 40 in which a magnetic field is not externally applied, the spin 45 in the perpendicular magnetic anisotropic layer 41a and the spin 46 in the perpendicular magnetic anisotropic layer 41b tend to form the antiparallel relation along a direction perpendicular to the in-plane direction (along the lamination direction) via the antiferromagnetic coupling induction layer 43.

Thus, when the antiferromagnetic coupling is generated between the perpendicular magnetic anisotropic layer 41a and the perpendicular magnetic anisotropic layer 41b, the magnetization of the perpendicular magnetic anisotropic layer 41a and that of the perpendicular magnetic anisotropic layer 41b cancel each other, so as to suppress the total magnetization of the magnetic layer 40.

Figure 4B:
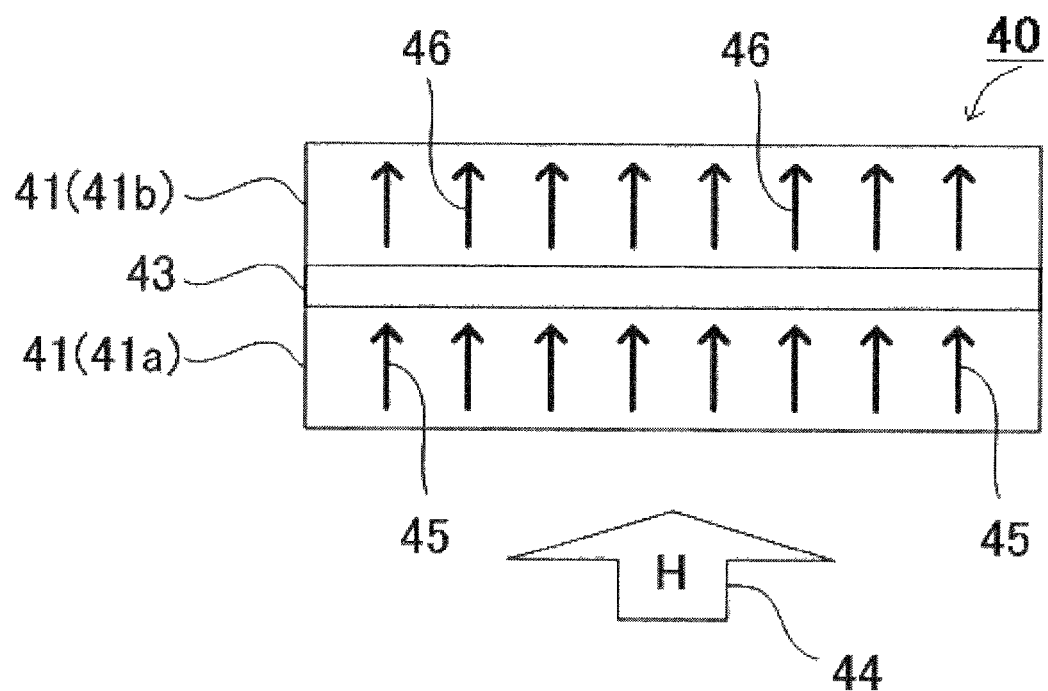
FIG. 4B shows an explanatory diagram schematically showing an example of a magnetic layer in which a magnetic field is applied.

FIG. 4B is an explanatory diagram schematically showing an example of the magnetic layer 40 in which a magnetic field is externally applied. As shown in FIG. 4B, when a magnetic field (H) 44 having strength higher than or equal to a certain value (for example, recording magnetic field) is externally applied, the spin 45 in the perpendicular magnetic anisotropic layer 41a turns around so as to turn toward the same direction as the spin 46 in the perpendicular magnetic anisotropic layer 41b.

This is because when the magnetic field 44 is externally applied, the antiferromagnetic coupling between the perpendicular magnetic anisotropic layer 41a and the perpendicular magnetic anisotropic layer 41b is cancelled, and behaviors of the spin 45 in the perpendicular magnetic anisotropic layer 41a and the spin 46 in the perpendicular magnetic anisotropic layer 41b are mainly controlled by the magnetic field 44.

When the spin 45 in the perpendicular magnetic anisotropic layer 41a and the spin 46 in the perpendicular magnetic anisotropic layer 41b turn toward the same direction, the total magnetization of the magnetic layer 40 is increased in strength, compared to that of the magnetic layer 40 in which a magnetic field is not applied.

Thus, when the magnetic field is externally applied to the magnetic layer 40, the magnetization occurs in a direction of applied magnetic field. On the other hand, when the magnetic field is cancelled, the residual magnetization is suppressed.

(Underlying Layer)

An underlying layer may be deposited under the magnetic layer 40, i.e., between the magnetic layer 40 and the top surfaces 202 of the convex portions 201, as necessary. The material used for the underlying layer include a metal, alloy and compound composed of at least one selected from the group consisting of Pt, Ru, Pd, Co, Cr, Ni, W, Ta, Al, P, Si, and Ti. As the material of the underlying layer, a platinum group metal such as Pt or Ru, or an alloy thereof is particularly preferable. The underlying layer may be composed of a single layer or a plurality of layers. The underlying layer may be deposited by a known method such as sputtering.

The thickness of the underlying layer is preferably 1 nm to 30 nm, and more preferably 3 nm to 10 nm.

(Protective Layer and Other Layers)

A protective layer formed from diamond-like carbon, or the like may be deposited on the magnetic layer 40, as necessary. The protective layer normally has a thickness of 10 nm or less. Further, a lubricant layer may be formed on the protective layer.

[Method for Producing Magnetic Transfer Master Carrier]

A method for producing a magnetic transfer master carrier of the present invention will be explained with an example of a method for producing a magnetic transfer master carrier according to one embodiment of the present invention.

A master carrier produced by the method for producing the magnetic transfer master carrier according to the embodiment, includes a magnetic layer 40 consisting of two perpendicular magnetic anisotropic layers 41 and an antiferromagnetic coupling induction layer deposited therebetween.

An original master is used for producing the magnetic transfer master carrier 20. First of all, a method for producing the original master will be explained with reference to FIGS. 5A to 5F.

(Production of Original Master)

FIGS. 5A to 5F are explanatory diagrams showing steps of producing an original master used in producing a magnetic transfer master carrier 20.

Figure 5A:
FIG. 5A is an explanatory diagram showing a step of producing an original master which is used for producing a magnetic transfer master carrier (first).
Figure 5B:
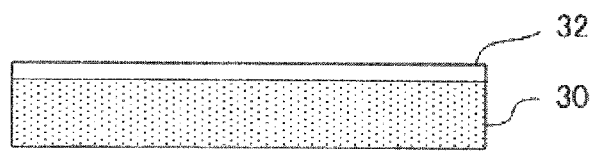
FIG. 5B is an explanatory diagram showing a step of producing an original master which is used for producing a magnetic transfer master carrier (second).

As shown in FIG. 5A, an original plate (Si substrate) 30, which is a silicon wafer having smooth surface is prepared, an electron beam resist solution is applied onto the original plate 30 by spin coating or the like so as to deposit a resist layer 32 thereon (see FIG. 5B), and the resist layer 32 is baked (prebaked).

Figure 5C:
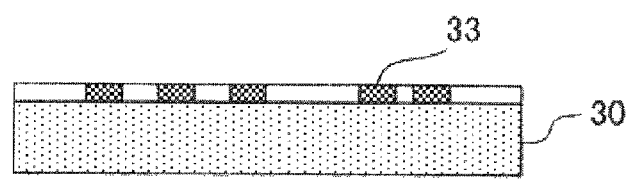
FIG. 5C is an explanatory diagram showing a step of producing an original master which is used for producing a magnetic transfer master carrier (third).

Next, the original plate 30 is set on a high-precision rotary stage or X-Y stage provided in an electron beam exposure apparatus (not shown), an electron beam modulated correspondingly to a servo signal is applied to the resist layer 32 while the original plate 30 is being rotated, and a pattern corresponding to the servo signal is written on the resist layer 32 by exposure (see FIG. 5C). 33 denotes a exposed portion in FIG. 5C.

Figure 5D:
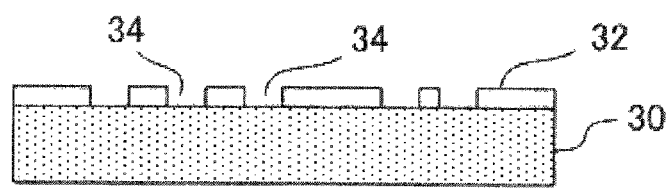
FIG. 5D is an explanatory diagram showing a step of producing an original master which is used for producing a magnetic transfer master carrier (fourth).

Subsequently, as shown in FIG. 5D, the resist layer 32 is developed, the exposed (written) portions 33 are removed so as to deposit a patterned resist layer 32 on the original plate 30.

Additionally, the resist applied onto the original plate 30 can be of positive type or negative type; it should be noted that an exposed (written) pattern formed by use of a positive-type resist is an inversion of an exposed (written) pattern formed by use of a negative-type resist.

After the developing step, a baking process (post-baking) is performed to enhance the adhesion between the resist layer 32 and the original plate 30.

Figure 5E:
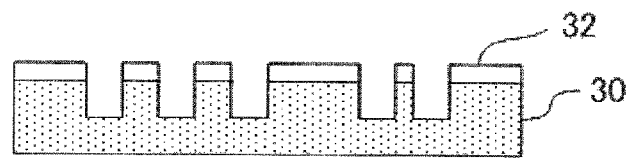
FIG. 5E is an explanatory diagram showing a step of producing an original master which is used for producing a magnetic transfer master carrier (fifth).

Subsequently, as shown in FIG. 5E, a part of the original plate 30 is removed (etched) in a predetermined depth from an opening portion 34 of the resist layer 32 with the resist layer 32 serving as a mask. As to the etching, anisotropic etching is preferable in that an undercut (side etching) can be minimized. As such anisotropic etching, reactive ion etching (RIE) can be preferably employed.

Figure 5F:
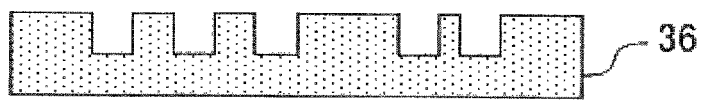
FIG. 5F is an explanatory diagram showing a step of producing an original master which is used for producing a magnetic transfer master carrier (sixth).

Thereafter, as shown in FIG. 5F, the resist layer 32 is removed after the etching is finished. As a method for removing the resist layer 32, either a dry method such as ashing, or a wet method such as removal using a release solution can be employed. The resist layer 32 is removed so as to obtain the original master 36.

(Production of Magnetic Transfer Master Carrier)

An example of a method for producing the magnetic transfer master carrier 20 using the original master 36 will be explained with reference to FIGS. 6G to 6L.

Figure 6G:
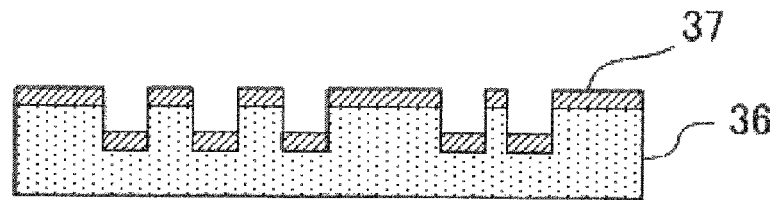
FIG. 6G is an explanatory diagram showing a step of producing a magnetic transfer master carrier (first).

As shown in FIG. 6G, on a surface of the original master 36 a conductive layer 37 having a uniform thickness is deposited. A method for forming the conductive layer 37 can be selected from a variety of metal film deposition methods such as physical vapor deposition (PVD), chemical vapor deposition (CVD), sputtering and ion plating. The conductive layer 37 is mainly composed of Ni. Such film mainly composed of Ni is suitably used for the conductive layer 37 because of easy film deposition and hardness. The thickness of the conductive layer 37 is not particularly limited and may be appropriately selected depending on the purpose. It is generally roughly several tens of nanometers.

Figure 6H:
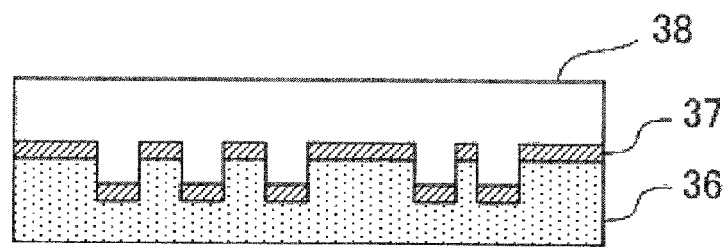
FIG. 6H is an explanatory diagram showing a step of producing a magnetic transfer master carrier (second).

As shown in FIG. 6H, a metal plate 38 having a desired thickness is formed on the surface of the original master 36 by electroforming. As a material of the metal plate, Ni or the like is used.

The electroforming is performed by a certain electroforming apparatus (not shown). The original master 36 is immersed in an electrolytic solution such as nickel sulfamate contained in an electrolytic tank in the electroforming apparatus. With the original master 36 serving as an anode, when the electric current is passed between the anode and a cathode (not shown), a metal plate is formed on the original master 36. The conditions of concentration, pH of the electrolytic solution, the electric current, and the like are appropriately set.

Figure 6I:
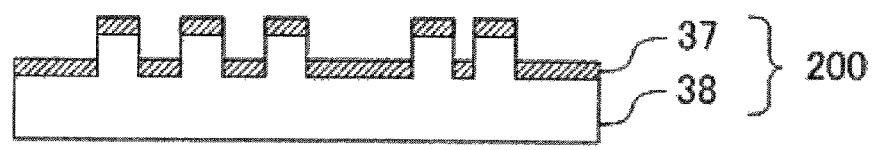
FIG. 6I is an explanatory diagram showing a step of producing a magnetic transfer master carrier (third).

Thereafter, the original master 36 on which the metal plate 38 is formed is taken out of the electrolytic tank in the electroforming apparatus, and then immersed in a release solution, such as pure water and the like. In the release solution, the metal plate 38 is separated from the original master 36. Thus, a base material 200 having a concavo-convex shape on its surface, which is inversion of the concavo-convex shape on the surface of the original master 36, can be obtained as shown in FIG. 6I.

Subsequently, the underlying layer (not shown) is deposited on the top surfaces 202 of the convex portions 201 on the surface of the base material 200. The underlying layer may be composed of Ta or the like. The underlying layer is deposited by sputtering with using the material as a target material.

Figure 6J:
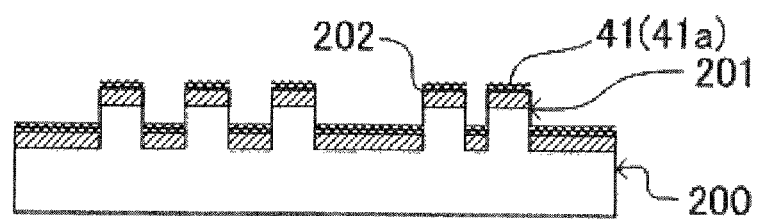
FIG. 6J is an explanatory diagram showing a step of producing a magnetic transfer master carrier (fourth).

As shown in FIG. 6J, the perpendicular magnetic anisotropic layer 41a is deposited on the top surfaces 202 of the convex portions 201 on the surface of the base material 200. The perpendicular magnetic anisotropic layer 41a may be composed of CoPt. The perpendicular magnetic anisotropic layer 41a is deposited by sputtering with using the material as a target material.

Figure 6K:
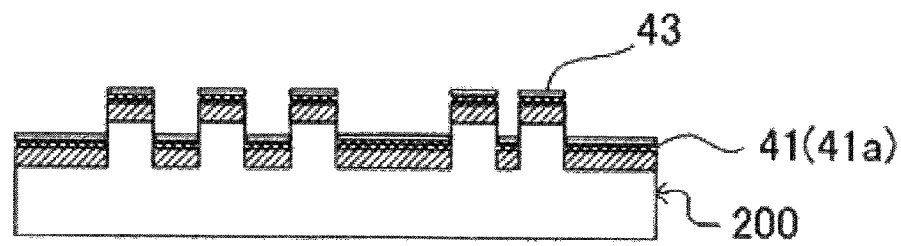
FIG. 6K is an explanatory diagram showing a step of producing a magnetic transfer master carrier (fifth).

Next, as shown in FIG. 6K, the antiferromagnetic coupling induction layer 43 is deposited on the perpendicular magnetic anisotropic layer 41a. The antiferromagnetic coupling induction layer 43 may be composed of Ru or the like. The antiferromagnetic coupling induction layer 43 is deposited by sputtering with using the material as a target material.

Figure 6L:
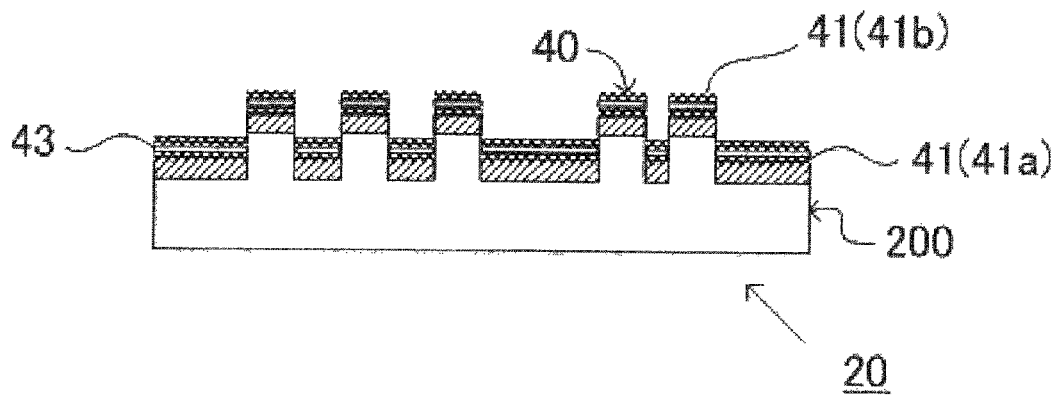
FIG. 6L is an explanatory diagram showing a step of producing a magnetic transfer master carrier (sixth).

Next, as shown in FIG. 6L, the perpendicular magnetic anisotropic layer 41b is deposited on the antiferromagnetic coupling induction layer 43. The perpendicular magnetic anisotropic layer 41b may be composed of CoPt. The perpendicular magnetic anisotropic layer 41b is deposited by sputtering with using the material as a target material.

Thereafter, the base material 200 is die-cut in a certain size, so as to obtain the magnetic transfer master carrier 20.

[Perpendicular Magnetic Recording Medium]

Figure 7:
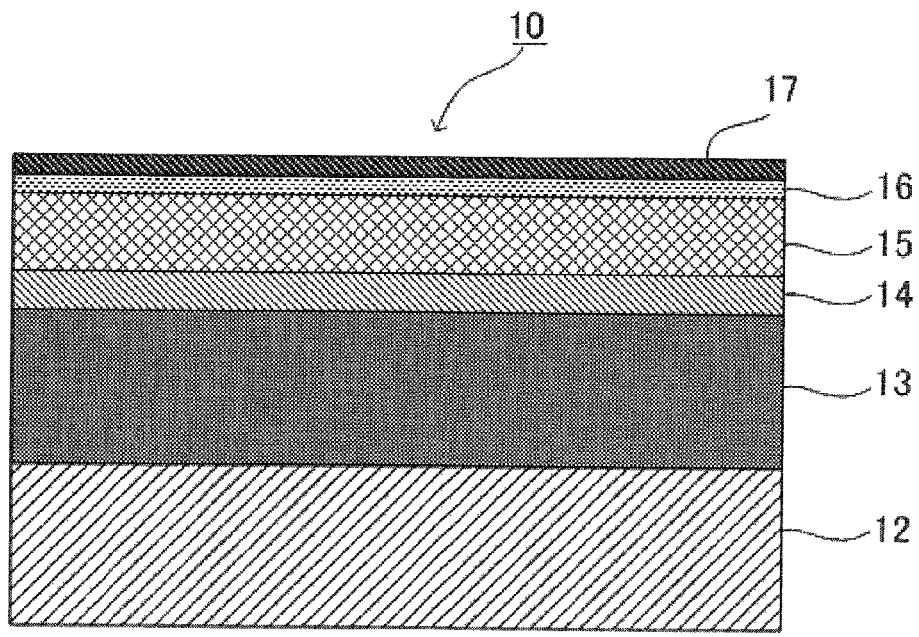
FIG. 7 is an explanatory diagram schematically showing an example of a cross-sectional view of a perpendicular magnetic recording medium.

The perpendicular magnetic recording medium on which information is magnetically transferred using the magnetic transfer master carrier 20 is not particularly limited and may be appropriately selected depending on the purpose. FIG. 7 is an explanatory diagram schematically showing an example of a cross-sectional view of the perpendicular magnetic recording medium. Here, a configuration of the perpendicular magnetic recording medium according to one embodiment will be explained with reference to FIG. 7.

As shown in FIG. 7, the perpendicular magnetic recording medium 10 includes a substrate 12, a soft magnetic layer (soft magnetic underlying layer: SUL) 13, a nonmagnetic layer (intermediate layer) 14 and a magnetic layer 15. Further, in FIG. 7, the perpendicular magnetic recording medium 10 includes a protective layer 16 and a lubricant layer 17 over the magnetic layer 15.

The substrate 12 is disk-shaped and made of a nonmagnetic material such as glass, Al (aluminum) or the like.

The soft magnetic layer 13 is deposited for the purpose of stabilizing the perpendicular magnetization state of the magnetic layer 16 and of improving sensitivity at the time of recording and reproduction. As the material for the soft magnetic layer 13, soft magnetic materials, such as CoZrNb, FeTaC, FeZrN, FeSi alloys, FeAl alloys, FeNi alloys such as permalloy, and FeCo alloys such as permendur can be used. The soft magnetic layer 13 is provided with magnetic anisotropy in radius directions (in a radial manner) from the center of the disk toward the outside.

The nonmagnetic layer 14 is provided in order to increase the magnetic anisotropy of the subsequently formed magnetic layer 15 in a perpendicular direction or for some other reasons. Examples of the material used for the nonmagnetic layer 14 include Ti (titanium), Cr (chromium), CrTi, CoCr, CrTa, CrMo, NiAl, Ru (ruthenium), Pd (palladium), Ta, and Pt.

The magnetic layer 15 is formed of a perpendicular magnetization film, which is configured such that magnetization easy axes in a magnetic film are oriented perpendicularly to the substrate 12, and information is recorded on the magnetic layer 15.

Examples of the material used for the magnetic layer 15 include Co (cobalt), a Co alloy such as CoPtCr, CoCr, CoPtCrTa, CoPtCrNbTa, CoCrB, CoNi, etc., Co alloy-$SiO_2$, Co alloy-$TiO_2$, Fe, and an Fe alloy such as FeCo, FePt, FeCoNi, etc.

The protective layer 16 is composed of carbon or the like, and the lubricant layer 17 is composed of a fluorine lubricant such as PFPE.

In the perpendicular magnetic recording medium 10, a magnetic layer 15 is formed over one surface of the substrate 12. However, in another embodiment, the magnetic layer 15 may be formed over both surfaces of the substrate 12.

Moreover, in another embodiment, a soft magnetic layer 13 and a nonmagnetic layer 14 may consist of a plurality of layers.

[Magnetic Transfer Method]

A method for magnetically transfer information on the perpendicular magnetic recording medium using the magnetic transfer master carrier will be explained.

The magnetic transfer method includes an initially magnetizing step, a closely attaching step and a magnetic transfer step, as already explained in the outline of a magnetic transfer technique. Hereinafter, the magnetic transfer method according to one embodiment will be explained with reference to FIGS. 1A to 1C and some other figures.

<Initially Magnetizing Step>

The initially magnetizing step is a step of applying a DC magnetic field (Hi) to the perpendicular magnetic recording medium 10 (slave disk) so as to initially magnetize the perpendicular magnetic recording medium 10.

As shown in FIG. 1A, a DC magnetic field (Hi) is applied to the perpendicular magnetic recording medium 10 in the initially magnetizing step. The DC magnetic field (initializing magnetic field) (Hi) is perpendicularly applied to a surface of the perpendicular magnetic recording medium 10. The DC magnetic field (Hi) is applied by a certain magnetic field applying unit (not shown). The strength of the DC magnetic field (Hi) is set greater than or equal to the coercive force Hc of the perpendicular magnetic recording medium 10.

Figure 8:
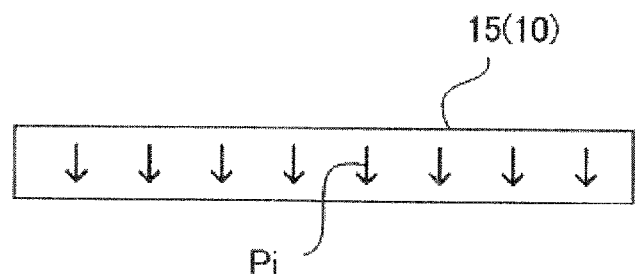
FIG. 8 is an explanatory diagram showing a magnetization direction of a magnetic layer of a perpendicular magnetic recording medium which has been initially magnetized.

FIG. 8 is an explanatory diagram showing a magnetization direction of a magnetic layer of a perpendicular magnetic recording medium which has been initially magnetized. As shown in FIG. 8, the magnetic layer 15 of the perpendicular magnetic recording medium 10 is initially magnetized in one direction perpendicular to a surface of the perpendicular magnetic recording medium 10. In FIG. 8, an arrow Pi denotes a magnetization direction of the magnetic layer.

<Closely Attaching Step>

The closely attaching step is a step of closely attaching the magnetic transfer master carrier (master disk) 20 to the perpendicular magnetic recording medium 10 which has been initially magnetized.

As shown in FIG. 1B, the magnetic transfer master carrier 20 and the perpendicular magnetic recording medium 10 which has been initially magnetized are overlapped so as to be closely attached.

In the closely attaching step, the magnetic layer 40 on the convex portions 201 on the surface of the magnetic transfer master carrier 20 and the magnetic layer (recording layer) of the perpendicular magnetic recording medium 10 are closely attached to each other The magnetic transfer master carrier 20 is closely attached to the perpendicular magnetic recording medium 10 by a predetermined pressing force.

If necessary, before the magnetic transfer master carrier 20 is closely attached to the perpendicular magnetic recording medium 10, the perpendicular magnetic recording medium 10 may be subjected to a cleaning process (burnishing) in which a minute protrusion or attached dust on its surface is removed using a glide head, a polisher or the like In the closely attaching step, as shown in FIG. 1B, in this embodiment, the magnetic transfer master carrier 20 is closely attached to one surface of the perpendicular magnetic recording medium 10. However, in another embodiment, the magnetic transfer master carrier 20 may be closely attached to both surfaces of the perpendicular magnetic recording medium (slave disk) having the magnetic layer on both surfaces.

As a magnetic field is not externally applied in the closely attaching step, in the magnetic layer 40 of the magnetic transfer master carrier 20, as shown in FIG. 4A, the antiferromagnetic coupling is generated between the perpendicular magnetic anisotropic layer 41a and the perpendicular magnetic anisotropic layer 41b. Thus, the magnetization generated from the magnetic layer 40 may be suppressed.

<Magnetic Transfer Step>

The magnetic transfer step is a step of applying a recording magnetic field Hd, which is generated in the opposite direction to the direction of the initializing magnetic field Hi, to the perpendicular magnetic recording medium 10 and the magnetic transfer master carrier 20 which have been closely attached to each other, so as to record information based on the magnetic transfer master carrier 20 in the perpendicular magnetic recording medium 10.

As shown in FIG. 1C, to the perpendicular magnetic recording medium 10 and the magnetic transfer master carrier 20 which have been closely attached to each other, a recording magnetic field Hd is generated in the opposite direction to the direction of the initializing magnetic field Hi by a magnetic field applying unit (not shown).

Figure 9:
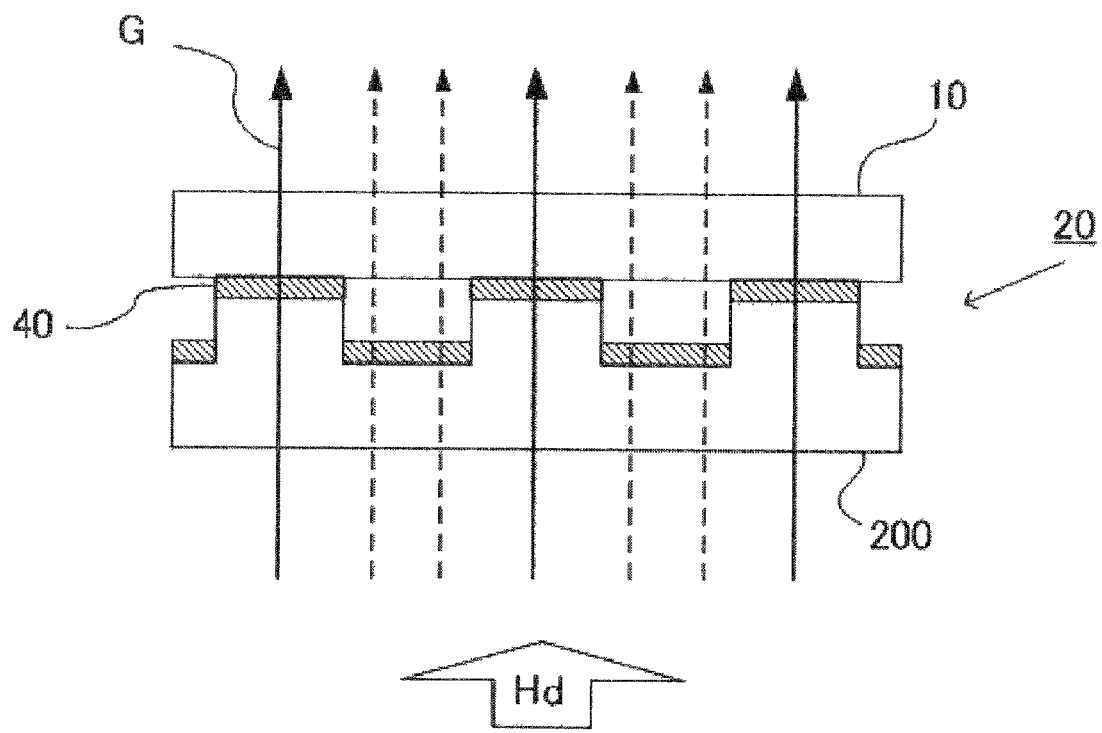
FIG. 9 is an explanatory diagram showing an example of a cross sectional view of a perpendicular magnetic recording medium and a magnetic transfer master carrier in a magnetic transfer step.

FIG. 9 is an explanatory diagram showing an example of a cross-sectional view of the perpendicular magnetic recording medium 10 and the magnetic transfer master carrier 20 in the magnetic transfer step. As shown in FIG. 9, when the recording magnetic field Hd is applied to the perpendicular magnetic recording medium 10 and the magnetic transfer master carrier 20 which have been closely attached to each other, a magnetic flux G generated by the magnetic field Hd enters the magnetic transfer master carrier 20 and then absorbed in the magnetic layer 40 of the magnetic transfer master carrier 20. As a result, the magnetic field becomes strong in a region of the convex portion 201 of the magnetic transfer master carrier 20. On the other hand, the magnetic field in a region of the concave portion 204 of the magnetic transfer master carrier 20 becomes weaker than that in the region of the convex portion 201. Thus, a pattern of the magnetic field is formed correspondingly to information to be recorded in the perpendicular magnetic recording medium 10.

As a result, in the region corresponding to the convex portion 201 the magnetization direction of the magnetic layer 15 of the perpendicular magnetic recording medium 10 is inverted so as to record information. Meanwhile, in the region corresponding to the concave portion 204 the magnetization direction of the magnetic layer 15 is not inverted.

Figure 10:
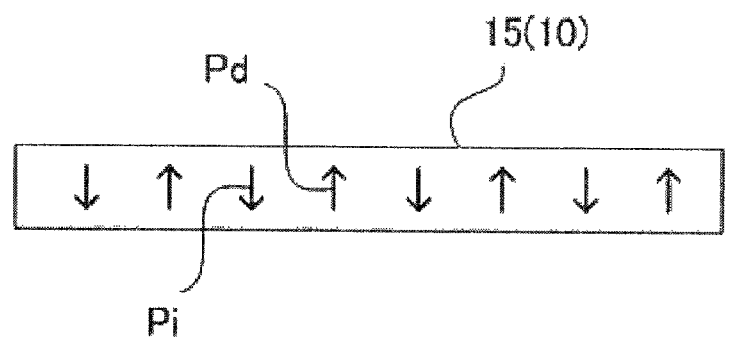
FIG. 10 is an explanatory diagram showing a magnetization direction in a magnetic layer of a perpendicular magnetic recording medium after a magnetic transfer step.

FIG. 10 is an explanatory diagram showing a magnetization direction in the magnetic layer of the perpendicular magnetic recording medium after a magnetic transfer step. As shown in FIG. 10, in the magnetic layer 15 of the perpendicular magnetic recording medium 10, information such as a servo signal, is recorded as a recording magnetization Pd which acts in the opposite direction to the direction of the initial magnetization Pi.

The recording magnetic field Hd is appropriately selected depending on the purpose. Generally, it is preferably 40% to 130%, and more preferably 50% to 120%, of the coercive force Hc of the magnetic layer 15 in the perpendicular magnetic recording medium 10.

In the magnetic transfer step, upon application of the recording magnetic field Hd, in the magnetic layer 40 of the magnetic transfer master carrier 20 the antiferromagnetic coupling between the perpendicular magnetic anisotropic layer 41a and the perpendicular magnetic anisotropic layer 41b is cancelled as shown in FIG. 4B, and the spin 45 of the perpendicular magnetic anisotropic layer 41a and the spin 46 of the perpendicular magnetic anisotropic layer 41b turn to the direction of externally applied recording magnetic field.

As a result, in the magnetic transfer step, the magnetic layer 40 of the magnetic transfer master carrier 20 itself has a magnetization in a perpendicular direction to a recording surface (surface of the magnetic layer) of the perpendicular magnetic recording medium.

Figure 11A:
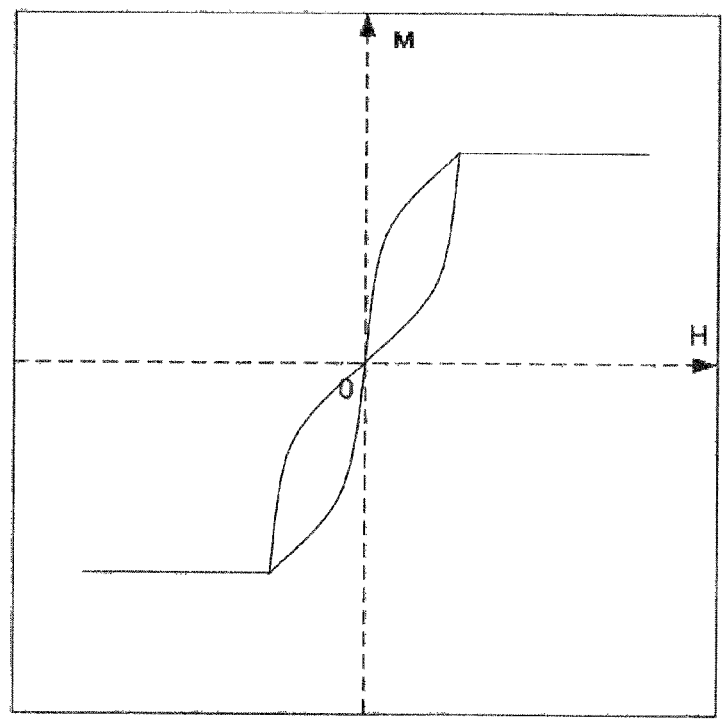
FIG. 11A is an explanatory diagram schematically showing a M-H curve of a magnetic layer of a magnetic transfer master carrier.

FIG. 11A is an explanatory diagram schematically showing a M-H curve of the magnetic layer 40 of the magnetic transfer master carrier 20 according to the present embodiment. The horizontal axis represents an externally applied magnetic field H and the vertical axis represents a magnetization M.

As shown in FIG. 11A, when a magnetic field is externally applied to the magnetic layer 40 of the magnetic transfer master carrier 20, the magnetization is increased. When the magnetic field is not externally applied thereto, the magnetization of the magnetic layer 40 becomes smallest. At this time, the magnetic layer 40 of the magnetic transfer master carrier 20 enables to remove the residual magnetization Mr completely, i.e. Mr=0.

Figure 11B:
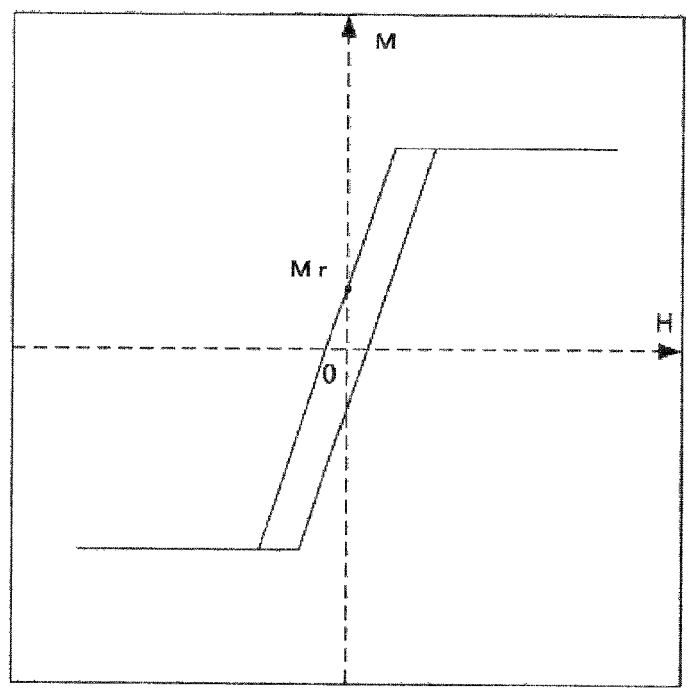
FIG. 11B is an explanatory diagram schematically showing a M-H curve of a magnetic layer of a conventional magnetic transfer master carrier.

FIG. 11B is an explanatory diagram schematically showing a M-H curve of a magnetic layer of a conventional magnetic transfer master carrier. The horizontal axis represents an externally applied magnetic field H and the vertical axis represents a magnetization M.

As shown in FIG. 11B, in the case of a conventional magnetic layer in which magnetization is increased by externally applying a magnetic field, even though the magnetic field is not externally applied to the conventional magnetic layer, magnetization is high, and it fails to achieve no residual magnetization Mr.

When information is recorded (magnetically transferred) in the perpendicular magnetic recording medium 10 using the magnetic transfer master carrier 20, the recording magnetic field Hd may be applied to the perpendicular magnetic recording medium 10 and the magnetic transfer master carrier 20 which have been closely attached to each other by the magnetic field applying unit while they are rotated by a certain rotating unit (not shown). In another embodiment, a mechanism for rotating the magnetic field applying unit may be provided such that the magnetic field applying unit is rotated relatively to the perpendicular magnetic recording medium 10 and the magnetic transfer master carrier 20.

Figure 12:
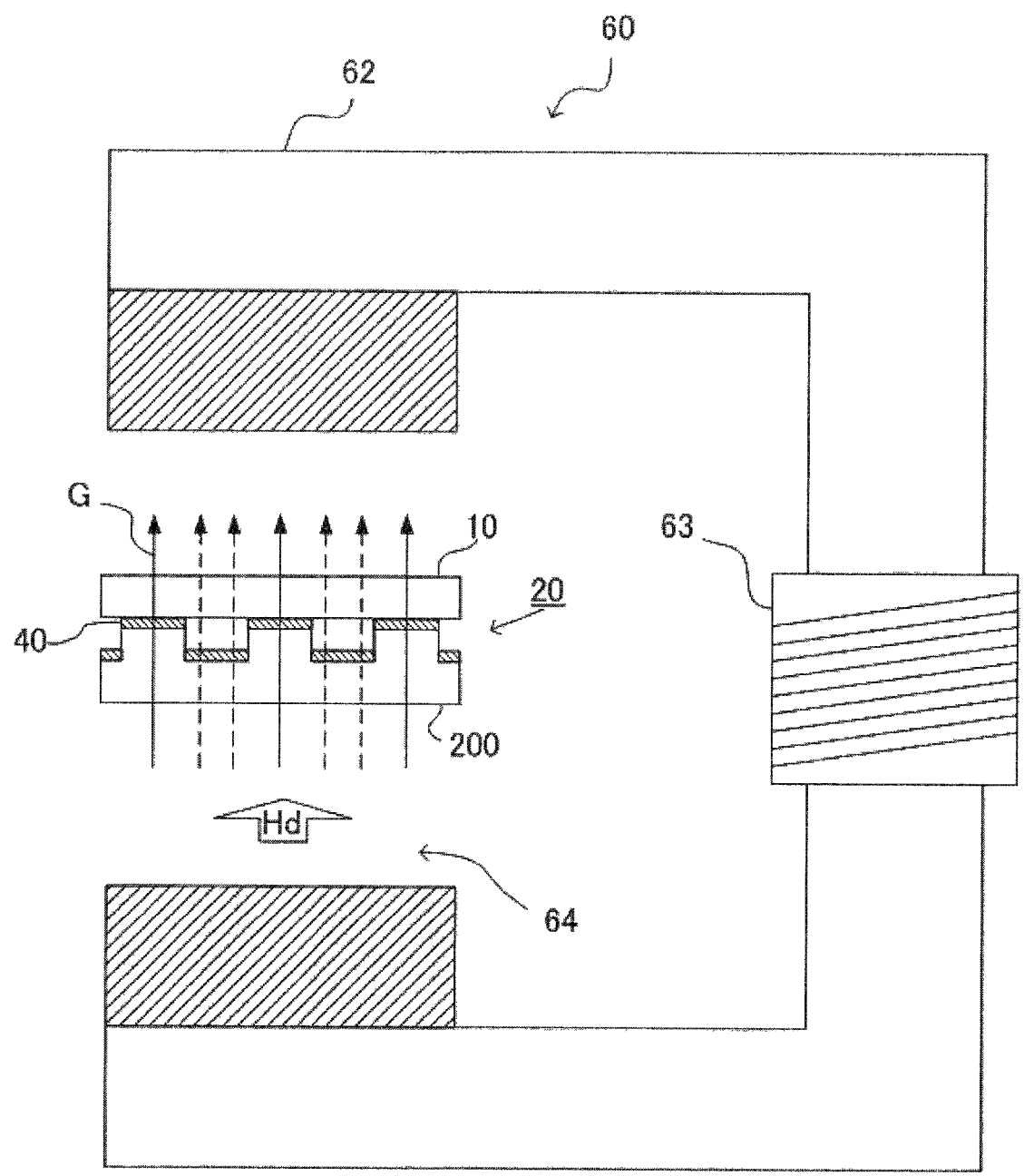
FIG. 12 is an explanatory diagram schematically showing an example of a magnetic transfer apparatus.

FIG. 12 is an explanatory diagram schematically showing an example of a magnetic transfer apparatus. The magnetic transfer apparatus includes a magnetic field applying unit 60 composed of an electromagnet which is formed by winding a coil 63 around a core 62. Upon application of an electric current to the coil 63, a magnetic field is generated in a gap 64 perpendicularly to the magnetic transfer master carrier 20 and the perpendicular magnetic recording medium 10 which has been closely attached to each other. The direction of the magnetic field generated can be changed depending upon the direction of the electric current applied to the coil 63. Therefore, this magnetic transfer apparatus makes it possible to initially magnetize the perpendicular magnetic recording medium 10 and also to perform magnetic transfer.

A perpendicular magnetic recording medium, recorded by means of the magnetic transfer master carrier 20, is installed in a magnetic recording and reproducing device such as a hard disk device, and used. The perpendicular magnetic recording medium is used to achieve a high-recording-density magnetic recording and reproducing device with high servo precision and excellent recording and reproducing properties.

Here, an outline of the magnetic transfer master carrier according to another embodiment of the present invention will be explained with reference to the drawing.

FIG. 13 is an explanatory diagram schematically showing an example of a magnetic transfer master carrier 20A according to another embodiment of the present invention. As shown in FIG. 13, the magnetic transfer master carrier 20A includes the magnetic layer 40 on the top surfaces 202 of the convex portions 201, wherein the magnetic layer includes three perpendicular magnetic anisotropic layers 41 (41a, 41b and 41c) and two antiferromagnetic coupling induction layers 43 (43a and 43b).

The antiferromagnetic coupling induction layer 43a is provided between the perpendicular magnetic anisotropic layers 41a and 41b, and the antiferromagnetic coupling induction layer 43b is provided between the perpendicular magnetic anisotropic layers 41b and 41c.

FIG. 13 represents a magnetic layer on which a magnetic field is not externally applied.

The antiferromagnetic coupling is generated between the perpendicular magnetic anisotropic layer 41a and the perpendicular magnetic anisotropic layer 41b, which are adjacent to the antiferromagnetic coupling induction layer 43a.

Moreover, the antiferromagnetic coupling is generated between the perpendicular magnetic anisotropic layer 41b and the perpendicular magnetic anisotropic layer 41c, which are adjacent to the antiferromagnetic coupling induction layer 43b.

When the magnetic field (for example, recording magnetic field) is externally applied to the magnetic transfer master carrier 20A, any electron spin in the perpendicular magnetic anisotropic layer 41 attempts to turn to a direction of externally applied magnetic field.

Thus, the magnetic transfer master carrier of the present invention includes three or more perpendicular magnetic anisotropic layers 41 in the magnetic layer 40.

EXAMPLES

Hereinafter, Examples of the present invention will be described, which however shall not be construed as limiting the scope of the present invention.

Example 1

Magnetic Transfer Master Carrier 1
(Production of Original Master)

An electron beam resist was applied onto an 8 inch Si wafer (an original plate) by spin coating so as to have a thickness of 100 nm. Then, the resist on the original plate was irradiated with an electron beam modulated corresponding to servo information etc. using a rotary electron beam exposure apparatus, so as to expose the resist. Thereafter, the exposed resist was developed, and then unexposed regions were removed so as to form a pattern of the resist on the original plate.

Next, the original plate was subjected to reactive etching, with the patterned resist used as a mask to etch away regions not masked with the resist. After the etching, the resist remaining on the original plate was removed by washing with a solvent. Then, the original plate was dried so as to obtain an original master to produce a magnetic transfer master carrier.
(Production of Magnetic Transfer Master Carrier)

On the original master a Ni conductive layer having 6 nm-thick was deposited by sputtering. Thereafter, a Ni layer was deposited over the original master by electroforming, with the original master on which the conductive layer had been formed used as a matrix. Then, the Ni layer was separated from the original master, and subjected to washing and other treatments so as to obtain a Ni base material having convex portions on its surface.

Next, the Ni base material was placed in a certain chamber, and then a Ta film having 10 nm-thick as an underlying layer was deposited on the convex portions of the Ni base material by sputtering.

The film deposition condition was as follows.
<Film Deposition Condition>
Film deposition pressure: 0.3 Pa
Distance between the Ni base material and a target: 200 mm
DC power: 300 W On the underlying layer deposited on the convex portions of the Ni base material, a CoPt film (Co80 at. %-Pt20 at. %) (thickness: 10 nm) as a perpendicular magnetic anisotropic layer (Magnetic Layer 1) was deposited by sputtering. The film deposition condition was as follows.
<Film Deposition Condition>
Film deposition pressure: 0.3 Pa
Distance between the Ni base material and a target: 200 mm
DC power: 1,000 W After the perpendicular magnetic anisotropic layer was deposited on the underlying layer, a Ru film having 0.7 nm-thick as an antiferromagnetic coupling induction layer was deposited on the perpendicular magnetic anisotropic layer (Magnetic Layer 1) by sputtering. The film deposition condition was as follows.
<Film Deposition Condition>
Film deposition pressure: 0.3 Pa
Distance between the Ni base material and a target: 200 mm
DC power: 100 W Thereafter, on the antiferromagnetic coupling induction layer, a CoPt film (Co80 at. %-Pt20 at. %) (thickness: 10 nm) as a perpendicular magnetic anisotropic layer (Magnetic Layer 2) was deposited by sputtering. The film deposition condition was as follows.
<Film Deposition Condition>
Film deposition pressure: 0.3 Pa
Distance between the Ni base material and a target: 200 mm
DC power: 1,000 W Thus, Magnetic Transfer Master Carrier 1 was produced.
Perpendicular Magnetic Recording Medium Over a glass substrate having 2.5 inch-thick, each layer was deposited by the following process so as to produce a perpendicular magnetic recording medium.

The produced perpendicular magnetic recording medium includes a soft magnetic layer, a first nonmagnetic orientation layer, a second nonmagnetic orientation layer, a magnetic layer, a protective layer, and a lubricant layer in this order.

The soft magnetic layer, the first nonmagnetic orientation layer, the second nonmagnetic orientation layer, the magnetic layer and the protective layer were deposited by sputtering, and the lubricant layer was deposited by dipping.
(Deposition of Soft Magnetic Layer)

As the soft magnetic layer, a CoZrNb film having 100 nm-thick was deposited.

Specifically, the soft magnetic layer was deposited in such a manner that the glass substrate was placed facing a CoZrNb target, Ar gas was flowed at a pressure of 0.6 Pa and electric discharge was performed at a DC power of 1,500 W.
(Deposition of First Nonmagnetic Orientation Layer)

As the first nonmagnetic orientation layer, a Ti film having 5 nm-thick was deposited.

Specifically, the first nonmagnetic orientation layer was deposited in such a manner that the glass substrate, on which the soft magnetic layer was deposited, was placed facing a Ti target, Ar gas was flowed at a pressure of 0.5 Pa and electric discharge was performed at a DC power of 1,000 W.
(Deposition of Second Nonmagnetic Orientation Layer)

As the second nonmagnetic orientation layer, a Ru film having 6 nm-thick was deposited.

Specifically, the second nonmagnetic orientation layer was deposited in such a manner that the glass substrate, over which the soft magnetic layer and the first nonmagnetic orientation layer were deposited, was placed facing a Ru target, Ar gas was flowed at a pressure of 0.8 Pa and electric discharge was performed at a DC power of 900 W.
(Deposition of Magnetic Layer)

As the magnetic layer, a CoCrPtO film having 18 nm-thick was deposited.

Specifically, the magnetic layer was deposited in such a manner that the glass substrate, over which the soft magnetic layer, the first nonmagnetic orientation layer and the second nonmagnetic orientation layer were deposited, was placed facing a CoCrPtO target, Ar gas containing 0.06% of $O_2$ was flowed at a pressure of 14 Pa and electric discharge was performed at a DC power of 290 W.
(Deposition of Protective Layer)

As a protective layer, a carbon film (C film) having 4 nm-thick was deposited.

Specifically, the protective layer was deposited in such a manner that the glass substrate, over which the soft magnetic layer, the first nonmagnetic orientation layer, the second nonmagnetic orientation layer and the magnetic layer were deposited, was placed facing a carbon target (C target), Ar gas was flowed at a pressure of 0.5 Pa and electric discharge was performed at a DC power of 1,000 W
(Deposition of Lubricant Layer)

As the lubricant layer, a layer composed of PFPE lubricant having 2 nm-thick was deposited on the protective layer.

The coercive force of the perpendicular magnetic recording medium was 334 kA/m (4.2 kOe).
Magnetic Transfer
(Initially Magnetizing Step)

A magnetic field was applied to the perpendicular magnetic recording medium so as to initially magnetize the perpendicular magnetic recording medium. The strength of the magnetic field applied in the initially magnetizing step was 10 kOe.
(Closely Attaching Step)

The magnetic transfer master carrier was closely attached to the perpendicular magnetic recording medium which had been initially magnetized, at a pressure of 9 kg/cm².

(Magnetic Transfer Step)

A recording magnetic field was applied to the perpendicular magnetic recording medium and the magnetic transfer master carrier which had been closely attached to each other. The strength of the recording magnetic field was 4.2 kOe.

Thereafter, the application of the recording magnetic field was stopped, and then the magnetic transfer master carrier was separated from the perpendicular magnetic recording medium.

Comparative Example 1

Magnetic Transfer Master Carrier 101

Magnetic Transfer Master Carrier 101 was produced in the same manner as in Example 1, except that the antiferromagnetic coupling induction layer was not deposited. By use of Magnetic Transfer Master Carrier 101, the magnetic transfer was performed to the perpendicular magnetic recording medium in the same manner as in Example 1.

Evaluation 1

Residual Magnetization of Magnetic Transfer Master Carrier 1

After the application of the recording magnetic field was stopped, a residual magnetization (Mr) in the magnetic layer of Magnetic Transfer Master Carrier 1 which had been separated from the perpendicular magnetic recording medium, was evaluated.

The residual magnetization (Mr) was measured using a vibrating sample magnetometer (VSM-C7 manufactured by TOEI INDUSTRY CO., LTD.). A sample having the same configuration as that of the magnetic layer of the magnetic transfer master carrier was produced and measured to obtain a M-H curve. From the M-H curve, magnetization of the magnetic layer to which no external magnetic field was applied was found.

The results are shown in Table 1.

Evaluation 2

Transfer Signal S/N Ratio of Perpendicular Magnetic Recording Medium

The signal S/N ratio of the perpendicular magnetic recording medium, in which information had been magnetically transferred using the Magnetic Transfer Master Carrier 101, was evaluated.

Specifically, a continuous single signal corresponding to a bit length of 100 nm (for 150 waveforms) in the perpendicular magnetic recording medium, in which information had been magnetically transferred using Magnetic Transfer Master Carrier 101 of Comparative Example 1, was read by a digital oscilloscope and waveform-analyzed so as to obtain a signal S/N ratio of the perpendicular magnetic recording medium as a reference value. The increase and decrease values to the reference value were obtained.

The results are shown in Table 1.

Example 2

Magnetic Transfer Master Carrier 2

Magnetic Transfer Master Carrier 2 was produced in the same manner as in Example 1, except that the thickness of the antiferromagnetic coupling induction layer was changed to 1 nm.

By use of Magnetic Transfer Master Carrier 2, the magnetic transfer was performed in the same manner as in Example 1.

Moreover, the residual magnetization and transfer signal S/N ratio of Magnetic Transfer Master Carrier 2 were evaluated in the same manner as in Example 1.

The results are shown in Table 1.

Example 3

Magnetic Transfer Master Carrier 3

Magnetic Transfer Master Carrier 3 was produced in the same manner as in Example 1, except that the thickness of the antiferromagnetic coupling induction layer was changed to 2 nm.

By use of Magnetic Transfer Master Carrier 3, the magnetic transfer was performed in the same manner as in Example 1.

Moreover, the residual magnetization and transfer signal S/N ratio of Magnetic Transfer Master Carrier 3 were evaluated in the same manner as in Example 1.

The results are shown in Table 1.

Example 4

Magnetic Transfer Master Carrier 4

Magnetic Transfer Master Carrier 4 was produced in the same manner as in Example 1, except that the thickness of the antiferromagnetic coupling induction layer was changed to 4 nm.

By use of Magnetic Transfer Master Carrier 4, the magnetic transfer was performed in the same manner as in Example 1.

Moreover, the residual magnetization and transfer signal S/N ratio of Magnetic Transfer Master Carrier 4 were evaluated in the same manner as in Example 1.

The results are shown in Table 1.

Example 5

Magnetic Transfer Master Carrier 5

Magnetic Transfer Master Carrier 5 was produced in the same manner as in Example 1, except that the thickness of the perpendicular magnetic anisotropic layer produced secondarily (Magnetic Layer 2) of the two perpendicular magnetic anisotropic layers was changed to 5 nm.

By use of Magnetic Transfer Master Carrier 5, the magnetic transfer was performed in the same manner as in Example 1.

Moreover, the residual magnetization of Magnetic Transfer Master Carrier 5 was evaluated in the same manner as in Example 1.

The results are shown in Table 2.

Example 6

Magnetic Transfer Master Carrier 6

Magnetic Transfer Master Carrier 6 was produced in the same manner as in Example 1, except that the thickness of the perpendicular magnetic anisotropic layer produced secondarily (Magnetic Layer 2) of the two perpendicular magnetic anisotropic layers was changed to 20 nm.

By use of Magnetic Transfer Master Carrier 6, the magnetic transfer was performed in the same manner as in Example 1.

Moreover, the residual magnetization of Magnetic Transfer Master Carrier 6 was evaluated in the same manner as in Example 1.

The results are shown in Table 2.

Example 7

Magnetic Transfer Master Carrier 7

Magnetic Transfer Master Carrier 7 was produced in the same manner as in Example 1, except that the thickness of the perpendicular magnetic anisotropic layer produced secondarily (Magnetic Layer 2) of the two perpendicular magnetic anisotropic layers was changed to 40 nm.

By use of Magnetic Transfer Master Carrier 7, the magnetic transfer was performed in the same manner as in Example 1.

Moreover, the residual magnetization of Magnetic Transfer Master Carrier 7 was evaluated in the same manner as in Example 1.

The results are shown in Table 2.

Example 8

Magnetic Transfer Master Carrier 8

Magnetic Transfer Master Carrier 8 was produced in the same manner as in Example 1, except that the thickness of the perpendicular magnetic anisotropic layer produced primarily (Magnetic Layer 1) of the two perpendicular magnetic anisotropic layers was changed to 40 nm.

By use of Magnetic Transfer Master Carrier 8, the magnetic transfer was performed in the same manner as in Example 1.

Moreover, the residual magnetization of Magnetic Transfer Master Carrier 8 was evaluated in the same manner as in Example 1.

The results are shown in Table 2.

Example 9

Magnetic Transfer Master Carrier 9

Magnetic Transfer Master Carrier 9 was produced in the same manner as in Example 1, except that the thickness of the perpendicular magnetic anisotropic layer produced primarily (Magnetic Layer 1) of the two perpendicular magnetic anisotropic layers was changed to 20 nm.

By use of Magnetic Transfer Master Carrier 9, the magnetic transfer was performed in the same manner as in Example 1.

Moreover, the residual magnetization of Magnetic Transfer Master Carrier 9 was evaluated in the same manner as in Example 1.

The results are shown in Table 2.

Example 10

Magnetic Transfer Master Carrier 10

Magnetic Transfer Master Carrier 10 was produced in the same manner as in Example 1, except that the thickness of the perpendicular magnetic anisotropic layer produced primarily (Magnetic Layer 1) of the two perpendicular magnetic anisotropic layers was changed to 5 nm.

By use of Magnetic Transfer Master Carrier 10, the magnetic transfer was performed in the same manner as in Example 1.

Moreover, the residual magnetization of Magnetic Transfer Master Carrier 10 was evaluated in the same manner as in Example 1.

The results are shown in Table 2.

TABLE 1

|  | Master carrier | Magnetic layer 1 | Induction layer | Magnetic layer 2 | Evaluation Mr (emu/cc) | S/N(dB) |
| --- | --- | --- | --- | --- | --- | --- |
| Example 1 | 1 | 10 nm | 0.7 nm | 10 nm | 53 | +1.0 |
| Example 2 | 2 | 10 nm | 1 nm | 10 nm | 59 | +0.6 |
| Example 3 | 3 | 10 nm | 2 nm | 10 nm | 83 | ±0 |
| Example 4 | 4 | 10 nm | 4 nm | 10 nm | 92 | −0.2 |
| Comparative Example 1 | 101 | 10 nm | N/A | 10 nm | 104 | Reference value |

TABLE 2

|  | Master carrier | Magnetic layer 1 | Induction layer | Magnetic layer 2 | Evaluation Mr (emu/cc) |
| --- | --- | --- | --- | --- | --- |
| Example 5 | 5 | 10 nm | 0.7 nm | 5 nm | 73 |
| Example 6 | 6 | 10 nm | 0.7 nm | 20 nm | 78 |
| Example 7 | 7 | 10 nm | 0.7 nm | 40 nm | 122 |
| Example 8 | 8 | 40 nm | 0.7 nm | 10 nm | 106 |
| Example 9 | 9 | 20 nm | 0.7 nm | 10 nm | 75 |
| Example 10 | 10 | 5 nm | 0.7 nm | 10 nm | 76 |

Example 11

Magnetic Transfer Master Carrier 11

The Ni base material was produced in the same manner as in Example 1.

Next, the Ni base material was placed in a certain chamber, and then a Ta film having 10 nm-thick as an underlying layer was deposited on convex portions of the Ni base material by sputtering. The film deposition condition was as follows.

<Film Deposition Condition>

Film deposition pressure: 0.3 Pa

Distance between the Ni base material and a target: 200 mm

DC power: 300 W

On the underlying layer deposited on the convex portions of the Ni base material, a CoPt film (Co80 at. %-Pt20 at. %) (thickness: 10 nm) as a perpendicular magnetic anisotropic layer (Magnetic Layer 1) was deposited by sputtering. The film deposition condition was as follows.

<Film Deposition Condition>
Film deposition pressure: 0.3 Pa
Distance between the Ni base material and a target: 200 mm
DC power: 1,000 W On the perpendicular magnetic anisotropic layer (Magnetic Layer 1), a Ru film having 0.7 nm-thick as an antiferromagnetic coupling induction layer (Induction layer 1) was deposited by sputtering. The film deposition condition was as follows.

<Film Deposition Condition>
Film deposition pressure: 0.3 Pa
Distance between the Ni base material and a target: 200 mm
DC power: 100 W Thereafter, on the antiferromagnetic coupling induction layer (Induction layer 1), a CoPt film (Co80 at. %-Pt20 at. %) (thickness: 10 nm) as a perpendicular magnetic anisotropic layer (Magnetic Layer 2) was deposited by sputtering. The film deposition condition was as follows.

<Film Deposition Condition>
Film deposition pressure: 0.3 Pa
Distance between the Ni base material and a target: 200 mm
DC power: 1,000 W On the perpendicular magnetic anisotropic layer (Magnetic Layer 2), a Ru film having 0.7 nm-thick as an antiferromagnetic coupling induction layer (Induction layer 2) was deposited by sputtering. The film deposition condition was as follows.

<Film Deposition Condition>
Film deposition pressure: 0.3 Pa
Distance between the Ni base material and a target: 200 mm
DC power: 100 W On the antiferromagnetic coupling induction layer (Induction layer 2), a CoPt film (Co80 at. %-Pt20 at. %) (thickness: 10 nm) as a perpendicular magnetic anisotropic layer (Magnetic Layer 3) was deposited by sputtering. The film deposition condition was as follows.

<Film Deposition Condition>
Film deposition pressure: 0.3 Pa
Distance between the Ni base material and a target: 200 mm
DC power: 1,000 W Thus, Magnetic Transfer Master Carrier 11 was produced.

By use of Magnetic Transfer Master Carrier 11, the magnetic transfer was performed in the same manner as in Example 1.

Moreover, the residual magnetization of Magnetic Transfer Master Carrier 11 was evaluated in the same manner as in Example 1. The results are shown in Table 3.

Example 12

Magnetic Transfer Master Carrier 12

Magnetic Transfer Master Carrier 12 was produced in the same manner as in Example 11, except that the thickness of the perpendicular magnetic anisotropic layer produced secondarily (Magnetic Layer 2) of the three perpendicular magnetic anisotropic layers was changed to 20 nm.

By use of Magnetic Transfer Master Carrier 12, the magnetic transfer was performed in the same manner as in Example 1.

Moreover, the residual magnetization of Magnetic Transfer Master Carrier 12 was evaluated in the same manner as in Example 1.

The results are shown in Table 3.

TABLE 3

| | Master carrier | Magnetic layer 1 | Induction layer | Magnetic layer 2 | Induction layer | Magnetic layer 3 | Evaluation Mr (emu/cc) |
|---|---|---|---|---|---|---|---|
| Example 11 | 11 | 10 nm | 0.7 nm | 5 nm | 0.7 nm | 10 nm | 72 |
| Example 12 | 12 | 10 nm | 0.7 nm | 20 nm | 0.7 nm | 10 nm | 68 |

Example 13

Magnetic Transfer Master Carrier 13

Magnetic Transfer Master Carrier 13 was produced in the same manner as in Example 1.

By use of Magnetic Transfer Master Carrier 13, the magnetic transfer was performed in the same manner as in Example 1.

Moreover, the residual magnetization and transfer signal S/N ratio of Magnetic Transfer Master Carrier 13 were evaluated in the same manner as in Example 1.

Furthermore, the residual magnetization of the perpendicular magnetic anisotropic layer was evaluated by the following method and total evaluation was performed on the basis of the following criteria.

The results are shown in Table 4.

Evaluation 3

Residual Magnetization of Perpendicular Magnetic Anisotropic Layer

After the application of the recording magnetic field was stopped, the residual magnetization ($Mr_u$, $Mr_l$) in the magnetic layer of the perpendicular magnetic anisotropic layer, which had been separated from the perpendicular magnetic recording medium, was evaluated.

The residual magnetization ($Mr_u$, $Mr_l$) was measured using a vibrating sample magnetometer (VSM-C7 manufactured by TOEI INDUSTRY CO., LTD.). A sample having the same configuration as that of the magnetic layer of the magnetic transfer master carrier was produced and measured to obtain a M-H curve. From the M-H curve, magnetization of the magnetic layer to which no external magnetic field was applied was found.

The results are shown in Table 4.

(Total Evaluation)

A: The S/N ratio was +0.7 dB or more, and the residual magnetization Mr was less than 60 emu/cc.

B: The S/N ratio was +0.1 dB or more.

C: The S/N ratio was less than ±0.1 dB.

D: The S/N ratio was less than ±0.1 dB and the residual magnetization Mr was 200 emu/cc or more.

Example 14

Magnetic Transfer Master Carrier 14

Magnetic Transfer Master Carrier 14 was produced in the same manner as in Example 1, except that the thickness of the antiferromagnetic coupling induction layer was changed to 0.5 nm.

By use of Magnetic Transfer Master Carrier 14, the magnetic transfer was performed in the same manner as in Example 1.

Moreover, the residual magnetization and transfer signal S/N ratio of Magnetic Transfer Master Carrier 14 were evaluated, and the total evaluation thereof was performed in the same manner as in Example 13.

The results are shown in Table 4.

Example 15

Magnetic Transfer Master Carrier 15

Magnetic Transfer Master Carrier 15 was produced in the same manner as in Example 1, except that the thickness of the antiferromagnetic coupling induction layer was changed to 0.6 nm.

By use of Magnetic Transfer Master Carrier 15, the magnetic transfer was performed in the same manner as in Example 1.

Moreover, the residual magnetization and transfer signal S/N ratio of Magnetic Transfer Master Carrier 15 were evaluated, and the total evaluation thereof was performed in the same manner as in Example 13.

The results are shown in Table 4.

Example 16

Magnetic Transfer Master Carrier 16

Magnetic Transfer Master Carrier 16 was produced in the same manner as in Example 1, except that the thickness of the antiferromagnetic coupling induction layer was changed to 0.8 nm.

By use of Magnetic Transfer Master Carrier 16, the magnetic transfer was performed in the same manner as in Example 1.

Moreover, the residual magnetization and transfer signal S/N ratio of Magnetic Transfer Master Carrier 16 were evaluated, and the total evaluation thereof was performed in the same manner as in Example 13.

The results are shown in Table 4.

Example 17

Magnetic Transfer Master Carrier 17

Magnetic Transfer Master Carrier 17 was produced in the same manner as in Example 1, except that the thickness of the antiferromagnetic coupling induction layer was changed to 0.9 nm.

By use of Magnetic Transfer Master Carrier 17, the magnetic transfer was performed in the same manner as in Example 1.

Moreover, the residual magnetization and transfer signal S/N ratio of Magnetic Transfer Master Carrier 17 were evaluated, and the total evaluation thereof was performed in the same manner as in Example 13.

The results are shown in Table 4.

Example 18

Magnetic Transfer Master Carrier 18

Magnetic Transfer Master Carrier 18 was produced in the same manner as in Example 2.

By use of Magnetic Transfer Master Carrier 18, the magnetic transfer was performed in the same manner as in Example 1.

Moreover, the residual magnetization and transfer signal S/N ratio of Magnetic Transfer Master Carrier 18 were evaluated, and the total evaluation thereof was performed in the same manner as in Example 13.

The results are shown in Table 4.

Example 19

Magnetic Transfer Master Carrier 19

Magnetic Transfer Master Carrier 19 was produced in the same manner as in Example 3.

By use of Magnetic Transfer Master Carrier 19, the magnetic transfer was performed in the same manner as in Example 1.

Moreover, the residual magnetization and transfer signal S/N ratio of Magnetic Transfer Master Carrier 19 were evaluated, and the total evaluation thereof was performed in the same manner as in Example 13.

The results are shown in Table 4.

Example 20

Magnetic Transfer Master Carrier 20

Magnetic transfer master carrier 20 was produced in the same manner as in Example 4.

By use of Magnetic transfer master carrier 20, the magnetic transfer was performed in the same manner as in Example 1.

Moreover, the residual magnetization and transfer signal S/N ratio of Magnetic transfer master carrier 20 were evaluated, and the total evaluation thereof was performed in the same manner as in Example 13.

The results are shown in Table 4.

Comparative Example 2

Magnetic Transfer Master Carrier 102

Magnetic Transfer Master Carrier 102 was produced in the same manner as in Comparative Example 1.

By use of Magnetic Transfer Master Carrier 102, the magnetic transfer was performed in the same manner as in Example 1.

Moreover, the residual magnetization and transfer signal S/N ratio of Magnetic Transfer Master Carrier 102 were evaluated, and the total evaluation thereof was performed in the same manner as in Example 13.

The results are shown in Table 4.

TABLE 4

| | Master carrier | Magnetic layer 1 Mr$_u$ (emu/cm³) | Magnetic layer 1 t$_u$ (nm) | Induction layer t (nm) | Magnetic layer 2 Mr$_l$ (emu/cm³) | Magnetic layer 2 t$_l$ (nm) | Mr$_u$t$_u$/Mr$_l$t$_l$ | Evaluation Mr (emu/cm³) | Evaluation S/R (dB) | Total Evaluation |
|---|---|---|---|---|---|---|---|---|---|---|
| Example 13 | 13 | 104 | 10 | 0.7 | 104 | 10 | 1 | 53 | +1.0 | A |
| Example 14 | 14 | 104 | 10 | 0.5 | 104 | 10 | 1 | 78 | +0.3 | B |
| Example 15 | 15 | 104 | 10 | 0.6 | 104 | 10 | 1 | 75 | +0.3 | B |
| Example 16 | 16 | 104 | 10 | 0.8 | 104 | 10 | 1 | 65 | +0.5 | B |
| Example 17 | 17 | 104 | 10 | 0.9 | 104 | 10 | 1 | 56 | +0.8 | A |
| Example 18 | 18 | 104 | 10 | 1 | 104 | 10 | 1 | 59 | +0.6 | B |
| Example 19 | 19 | 104 | 10 | 2 | 104 | 10 | 1 | 83 | ±0 | C |
| Example 20 | 20 | 104 | 10 | 4 | 104 | 10 | 1 | 92 | −0.2 | C |
| Comparative Example 2 | 102 | 104 | 10 | N/A | 104 | 10 | 1 | 104 | Reference value | C |

Example 21

Magnetic Transfer Master Carrier 21

Magnetic Transfer Master Carrier 21 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 21, the magnetic transfer was performed in the same manner as in Example 1.

The residual magnetization and transfer signal S/N ratio of Magnetic Transfer Master Carrier 21 were evaluated, and the total evaluation thereof was performed in the same manner as in Example 13.

The results are shown in Table 5.

Example 22

Magnetic Transfer Master Carrier 22

Magnetic Transfer Master Carrier 22 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 22, the magnetic transfer was performed in the same manner as in Example 1.

The residual magnetization and transfer signal S/N ratio of Magnetic Transfer Master Carrier 22 were evaluated, and the total evaluation thereof was performed in the same manner as in Example 13.

The results are shown in Table 5.

Example 23

Magnetic Transfer Master Carrier 23

Magnetic Transfer Master Carrier 23 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 23, the magnetic transfer was performed in the same manner as in Example 1.

The residual magnetization and transfer signal S/N ratio of Magnetic Transfer Master Carrier 23 were evaluated, and the total evaluation thereof was performed in the same manner as in Example 13.

The results are shown in Table 5.

Example 24

Magnetic Transfer Master Carrier 24

Magnetic Transfer Master Carrier 24 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 24, the magnetic transfer was performed in the same manner as in Example 1.

The residual magnetization and transfer signal S/N ratio of Magnetic Transfer Master Carrier 24 were evaluated, and the total evaluation thereof was performed in the same manner as in Example 13.

The results are shown in Table 5.

Example 25

Magnetic Transfer Master Carrier 25

Magnetic Transfer Master Carrier 25 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 25, the magnetic transfer was performed in the same manner as in Example 1.

The residual magnetization and transfer signal S/N ratio of Magnetic Transfer Master Carrier 25 were evaluated, and the total evaluation thereof was performed in the same manner as in Example 13.

The results are shown in Table 5.

Example 26

Magnetic Transfer Master Carrier 26

Magnetic Transfer Master Carrier 26 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 26, the magnetic transfer was performed in the same manner as in Example 1.

The residual magnetization and transfer signal S/N ratio of Magnetic Transfer Master Carrier 26 were evaluated, and the total evaluation thereof was performed in the same manner as in Example 13.

The results are shown in Table 5.

Example 27

Magnetic Transfer Master Carrier 27

Magnetic Transfer Master Carrier 27 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 27, the magnetic transfer was performed in the same manner as in Example 1.

The residual magnetization and transfer signal S/N ratio of Magnetic Transfer Master Carrier 27 were evaluated, and the total evaluation thereof was performed in the same manner as in Example 13.

The results are shown in Table 5.

Example 28

Magnetic Transfer Master Carrier 28

Magnetic Transfer Master Carrier 28 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 28, the magnetic transfer was performed in the same manner as in Example 1.

The residual magnetization and transfer signal S/N ratio of Magnetic Transfer Master Carrier 28 were evaluated, and the total evaluation thereof was performed in the same manner as in Example 13.

The results are shown in Table 5.

Example 29

Magnetic Transfer Master Carrier 29

Magnetic Transfer Master Carrier 29 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 29, the magnetic transfer was performed in the same manner as in Example 1.

The residual magnetization and transfer signal S/N ratio of Magnetic Transfer Master Carrier 29 were evaluated, and the total evaluation thereof was performed in the same manner as in Example 13.

The results are shown in Table 5.

Example 30

Magnetic Transfer Master Carrier 30

Magnetic Transfer Master Carrier 30 was produced in the same manner as in Example 1, except that the thickness of the perpendicular magnetic anisotropic layer produced primarily (Magnetic Layer 1) was changed to 5 nm and that the thickness thereof produced secondarily (Magnetic Layer 2) was changed to 15 nm, of the two perpendicular magnetic anisotropic layers in Example 1.

By use of Magnetic Transfer Master Carrier 30, the magnetic transfer was performed in the same manner as in Example 1.

The residual magnetization and transfer signal S/N ratio of Magnetic Transfer Master Carrier 30 were evaluated, and the total evaluation thereof was performed in the same manner as in Example 13.

The results are shown in Table 5.

TABLE 5

| | | Magnetic layer | | | | | | Evaluation | | |
| | | Magnetic layer 1 | | Induction layer | Magnetic layer 2 | | | | | |
| | Master carrier | $Mr_u$ (emu/cm$^3$) | $t_u$ (nm) | t (nm) | $Mr_l$ (emu/cm$^3$) | $t_l$ (nm) | $Mr_u t_u / Mr_l t_l$ | Mr (emu/cm$^3$) | S/R (dB) | Total Evaluation |
|---|---|---|---|---|---|---|---|---|---|---|
| Example 21 | 21 | 104 | 5 | 0.7 | 104 | 15 | 0.33 | 90 | −0.3 | C |
| Example 22 | 22 | 104 | 6 | 0.7 | 104 | 14 | 0.43 | 84 | −0.2 | C |
| Example 23 | 23 | 104 | 7 | 0.7 | 104 | 13 | 0.53 | 75 | +0.2 | B |
| Example 24 | 24 | 104 | 8 | 0.7 | 104 | 12 | 0.67 | 64 | +0.4 | B |
| Example 25 | 25 | 104 | 9 | 0.7 | 104 | 11 | 0.81 | 55 | +0.9 | A |
| Example 26 | 26 | 104 | 11 | 0.7 | 104 | 9 | 1.2 | 58 | +0.8 | A |
| Example 27 | 27 | 104 | 12 | 0.7 | 104 | 8 | 1.5 | 61 | +0.6 | B |
| Example 28 | 28 | 104 | 13 | 0.7 | 104 | 7 | 1.9 | 72 | +0.3 | B |
| Example 29 | 29 | 104 | 14 | 0.7 | 104 | 6 | 2.3 | 83 | ±0 | C |
| Example 30 | 30 | 104 | 15 | 0.7 | 104 | 5 | 3 | 86 | −0.1 | C |

Example 31

Magnetic Transfer Master Carrier 31

Magnetic Transfer Master Carrier 31 was produced in the same manner as in Example 1, except that the atomic ratio of the material of the perpendicular magnetic anisotropic layer produced secondarily (Magnetic Layer 2) of the two perpendicular magnetic anisotropic layers in Example 1 was changed to a CoPt film (Co70 at. %-Pt30 at. %).

By use of Magnetic Transfer Master Carrier 31, the magnetic transfer was performed in the same manner as in Example 1.

The residual magnetization and transfer signal S/N ratio of Magnetic Transfer Master Carrier 31 were evaluated, and the total evaluation thereof was performed in the same manner as in Example 13.

The results are shown in Table 6.

Example 32

Magnetic Transfer Master Carrier 32

Magnetic Transfer Master Carrier 32 was produced in the same manner as in Example 1, except that the atomic ratio of the material of the perpendicular magnetic anisotropic layer produced secondarily (Magnetic Layer 2) of the two perpendicular magnetic anisotropic layers in Example 1 was changed to a CoPt film (Co74 at. %-Pt26 at. %).

By use of Magnetic Transfer Master Carrier 32, the magnetic transfer was performed in the same manner as in Example 1.

The residual magnetization and transfer signal S/N ratio of Magnetic Transfer Master Carrier 32 were evaluated, and the total evaluation thereof was performed in the same manner as in Example 13.

The results are shown in Table 6.

Example 33

Magnetic Transfer Master Carrier 33

Magnetic Transfer Master Carrier 33 was produced in the same manner as in Example 1, except that the atomic ratio of the material of the perpendicular magnetic anisotropic layer produced secondarily (Magnetic Layer 2) of the two perpendicular magnetic anisotropic layers in Example 1 was changed to a CoPt film (Co76 at. %-Pt24 at. %).

By use of Magnetic Transfer Master Carrier 33, the magnetic transfer was performed in the same manner as in Example 1.

The residual magnetization and transfer signal S/N ratio of Magnetic Transfer Master Carrier 33 were evaluated, and the total evaluation thereof was performed in the same manner as in Example 13.

The results are shown in Table 6.

Example 34

Magnetic Transfer Master Carrier 34

Magnetic Transfer Master Carrier 34 was produced in the same manner as in Example 1, except that the atomic ratio of the material of the perpendicular magnetic anisotropic layer produced secondarily (Magnetic Layer 2) of the two perpendicular magnetic anisotropic layers in Example 1 was changed to a CoPt film (Co78 at. %-Pt22 at. %).

By use of Magnetic Transfer Master Carrier 34, the magnetic transfer was performed in the same manner as in Example 1.

The residual magnetization and transfer signal S/N ratio of Magnetic Transfer Master Carrier 34 were evaluated, and the total evaluation thereof was performed in the same manner as in Example 13.

The results are shown in Table 6.

Example 35

Magnetic Transfer Master Carrier 35

Magnetic Transfer Master Carrier 35 was produced in the same manner as in Example 1, except that the atomic ratio of the material of the perpendicular magnetic anisotropic layer produced primarily (Magnetic Layer 1) of the two perpendicular magnetic anisotropic layers in Example 1 was changed to a CoPt film (Co78 at. %-Pt22 at. %).

By use of Magnetic Transfer Master Carrier 35, the magnetic transfer was performed in the same manner as in Example 1.

The residual magnetization and transfer signal S/N ratio of Magnetic Transfer Master Carrier 35 were evaluated, and the total evaluation thereof was performed in the same manner as in Example 13.

The results are shown in Table 6.

Example 36

Magnetic Transfer Master Carrier 36

Magnetic Transfer Master Carrier 36 was produced in the same manner as in Example 1, except that the atomic ratio of the material of the perpendicular magnetic anisotropic layer produced primarily (Magnetic Layer 1) of the two perpendicular magnetic anisotropic layers in Example 1 was changed to a CoPt film (Co76 at. %-Pt24 at. %).

By use of Magnetic Transfer Master Carrier 36, the magnetic transfer was performed in the same manner as in Example 1.

The residual magnetization and transfer signal S/N ratio of Magnetic Transfer Master Carrier 36 were evaluated, and the total evaluation thereof was performed in the same manner as in Example 13.

The results are shown in Table 6.

Example 37

Magnetic Transfer Master Carrier 37

Magnetic Transfer Master Carrier 37 was produced in the same manner as in Example 1, except that the atomic ratio of the material of the perpendicular magnetic anisotropic layer produced primarily (Magnetic Layer 1) of the two perpendicular magnetic anisotropic layers in Example 1 was changed to a CoPt film (Co74 at. %-Pt26 at. %).

By use of Magnetic Transfer Master Carrier 37, the magnetic transfer was performed in the same manner as in Example 1.

The residual magnetization and transfer signal S/N ratio of Magnetic Transfer Master Carrier 37 were evaluated, and the total evaluation thereof was performed in the same manner as in Example 13.

The results are shown in Table 6.

Example 38

Magnetic Transfer Master Carrier 38

Magnetic Transfer Master Carrier 38 was produced in the same manner as in Example 1, except that the atomic ratio of the material of the perpendicular magnetic anisotropic layer produced primarily (Magnetic Layer 1) of the two perpendicular magnetic anisotropic layers in Example 1 was changed to a CoPt film (Co70 at. %-Pt30 at. %).

By use of Magnetic Transfer Master Carrier 38, the magnetic transfer was performed in the same manner as in Example 1.

The residual magnetization and transfer signal S/N ratio of Magnetic Transfer Master Carrier 38 were evaluated, and the total evaluation thereof was performed in the same manner as in Example 13.

The results are shown in Table 6.

TABLE 6

| | | Magnetic layer | | | | | Evaluation | | |
|---|---|---|---|---|---|---|---|---|---|
| | | Magnetic layer 1 | | Induction layer | Magnetic layer 2 | | | | |
| | Master carrier | $Mr_u$ (emu/cm$^3$) | $t_u$ (nm) | t (nm) | $Mr_l$ (emu/cm$^3$) | $t_l$ (nm) | $Mr_u t_u / Mr_l t_l$ | Mr (emu/cm$^3$) | S/R (dB) | Total Evaluation |
| Example 31 | 31 | 104 | 10 | 0.7 | 352 | 10 | 0.3 | 115 | −0.4 | C |
| Example 32 | 32 | 104 | 10 | 0.7 | 221 | 10 | 0.47 | 88 | −0.1 | C |
| Example 33 | 33 | 104 | 10 | 0.7 | 154 | 10 | 0.68 | 63 | +0.5 | B |
| Example 34 | 34 | 104 | 10 | 0.7 | 128 | 10 | 0.81 | 54 | +0.9 | A |
| Example 35 | 35 | 128 | 10 | 0.7 | 104 | 10 | 1.23 | 58 | +0.8 | A |
| Example 36 | 36 | 154 | 10 | 0.7 | 104 | 10 | 1.5 | 67 | +0.4 | B |
| Example 37 | 37 | 221 | 10 | 0.7 | 104 | 10 | 2.1 | 91 | −0.2 | C |
| Example 38 | 38 | 352 | 10 | 0.7 | 104 | 10 | 3.4 | 128 | −0.6 | C |

What is claimed is:

1. A magnetic transfer master carrier comprising:
   a base material having convex portions on its surface, the convex portions being provided corresponding to a pattern of information to be recorded on a perpendicular magnetic recording medium; and
   a magnetic layer deposited at least on top surfaces of the convex portions,
   wherein when a magnetic field is applied to the magnetic transfer master carrier, the magnetic layer absorbs a magnetic flux so as to form a pattern of the magnetic field,
   wherein the magnetic layer comprises:
   at least two perpendicular magnetic anisotropic layers; and
   an antiferromagnetic coupling induction layer which is provided so as to be sandwiched in between two neighboring layers of all the perpendicular magnetic anisotropic layers, and to induce antiferromagnetic coupling therebetween,
   wherein when in the two perpendicular magnetic anisotropic layers sandwiching the antiferromagnetic coupling induction layer, a residual magnetization $Mr_u$ of one of the perpendicular magnetic anisotropic layers deposited close to each convex portion is multiplied by a thickness $t_u$ thereof to give $Mr_u t_u$, and a residual magnetization $Mr_l$ of the other perpendicular magnetic anisotropic layer is multiplied by a thickness $t_l$ thereof to give $Mr_l t_l$, a ratio of $Mr_u t_u$ to $Mr_l t_l$, $Mr_u t_u / Mr_l t_l$, is 0.5 to 2.

2. The magnetic transfer master carrier according to claim 1, wherein when the two perpendicular magnetic anisotropic layers sandwiching the antiferromagnetic coupling induction layer have the same residual magnetization, one of the perpendicular magnetic anisotropic layers deposited close to each convex portion has a thickness "wa" and the other perpendicular magnetic anisotropic layer has a thickness "wb", a ratio of "wb" to "wa", "wb/wa" is 2 to 0.2.

3. The magnetic transfer master carrier according to claim 2, wherein the ratio of "wb" to "wa", "wb/wa" is 2 to 0.5.

4. The magnetic transfer master carrier according to claim 2, wherein the ratio of "wb" to "wa", "wb/wa" is 1.5 to 0.5.

5. The magnetic transfer master carrier according to claim 1, wherein the perpendicular magnetic anisotropic layer has a thickness of 2 nm to 60 nm.

6. The magnetic transfer master carrier according to claim 1, wherein the perpendicular magnetic anisotropic layer of the magnetic layer is deposited by sputtering under the following condition 1 and the antiferromagnetic coupling induction layer of the magnetic layer is deposited by sputtering under the following condition 2:
   <Condition 1>
   Target material: CoPt
   Pressure: 0.3 Pa
   Distance between a base material and a target: 200 mm
   DC power: 1,000 W
   <Condition 2>
   Target material: Ru
   Pressure: 0.3 Pa
   Distance between a base material and a target: 200 mm
   DC power: 100 W.

7. A magnetic transfer method comprising:
   initially magnetizing a perpendicular magnetic recording medium by applying a magnetic field thereto;
   closely attaching a magnetic transfer master carrier to the perpendicular magnetic recording medium which has been initially magnetized; and
   magnetically transferring information to the perpendicular magnetic recording medium by applying a magnetic field which acts in the opposite direction to the initial magnetization, with the perpendicular magnetic recording medium and the magnetic transfer master carrier closely attached to each other, to thereby record the information on the perpendicular magnetic recording medium,
   wherein the magnetic transfer master carrier comprises:
   a base material having convex portions on its surface, the convex portions being provided corresponding to a pattern of information to be recorded on the perpendicular magnetic recording medium; and
   a magnetic layer deposited at least on top surfaces of the convex portions,
   wherein when a magnetic field is applied to the magnetic transfer master carrier, the magnetic layer absorbs a magnetic flux so as to form a pattern of the magnetic field,
   wherein the magnetic layer comprises:
   at least two perpendicular magnetic anisotropic layers; and an antiferromagnetic coupling induction layer which is provided so as to be sandwiched in between two neighboring layers of all the perpendicular magnetic anisotropic layers, and to induce antiferromagnetic coupling therebetween, wherein when in the two perpendicular magnetic anisotropic layers sandwiching the antiferromagnetic coupling induction layer, a residual magnetization $Mr_u$ of one of the perpendicular magnetic anisotropic layers deposited close to each convex portion is multiplied by a thickness $t_u$ thereof to give $Mr_u t_u$, and a residual magnetization $Mr_l$ of the other perpendicular magnetic anisotropic layer is multiplied by a thickness $t_l$ thereof to give $Mr_l t_l$, a ratio of $Mr_u t_u$ to $Mr_l t_l$, $Mr_u t_u / Mr_l t_l$, is 0.5 to 2.

* * * * *